(12) United States Patent
Yoshimatsu et al.

(10) Patent No.: US 8,422,562 B2
(45) Date of Patent: Apr. 16, 2013

(54) DECODING CIRCUIT, DECODING METHOD, AND IMAGE REPRODUCING APPARATUS

(75) Inventors: Naoki Yoshimatsu, Aichi (JP); Eri Hirai, Aichi (JP)

(73) Assignee: Panasonic Corporation, Osaka (JP)

( * ) Notice: Subject to any disclaimer, the term of this patent is extended or adjusted under 35 U.S.C. 154(b) by 1087 days.

(21) Appl. No.: 12/438,937

(22) PCT Filed: Feb. 27, 2008

(86) PCT No.: PCT/JP2008/000369
§ 371 (c)(1),
(2), (4) Date: Feb. 25, 2009

(87) PCT Pub. No.: WO2008/136164
PCT Pub. Date: Nov. 13, 2008

(65) Prior Publication Data
US 2010/0014592 A1    Jan. 21, 2010

(30) Foreign Application Priority Data

Apr. 23, 2007   (JP) ................. 2007-112553

(51) Int. Cl.
| | |
|---|---|
| H04N 11/02 | (2006.01) |
| H04N 11/04 | (2006.01) |
| H04N 7/12 | (2006.01) |
| H04B 1/66 | (2006.01) |
| G06F 13/16 | (2006.01) |
| H04N 9/804 | (2006.01) |
| H04N 7/26 | (2006.01) |
| H04N 5/92 | (2006.01) |
| H04J 3/00 | (2006.01) |
| G06K 9/36 | (2006.01) |

(52) U.S. Cl.
USPC ............ 375/240.25; 375/240.02; 375/240.24; 375/240.26; 360/48

(58) Field of Classification Search ............ 375/240.25, 375/240.26, 240.24, 240.02; 360/48
See application file for complete search history.

(56) References Cited

U.S. PATENT DOCUMENTS 6,011,663 A * 1/2000 Inoue et al. ............. 360/48
(Continued)

FOREIGN PATENT DOCUMENTS
EP      1684524 A1 *  7/2006
(Continued)

OTHER PUBLICATIONS

Hiroshi Tsutsui, Koichi Hattori, Hiroyuki Ochi, Yukihiro Nakamura; "A high-throughput pipelined parallel architecture for JPEG XR encoding"; Dec. 2012; Transactions on Embedded Computing Systems (TECS), vol. 11 Issue 4; Publisher: ACM; pp. 1-25.*

(Continued)

*Primary Examiner* — Andrew L Nalven
*Assistant Examiner* — Courtney Fields
(74) *Attorney, Agent, or Firm* — Wenderoth, Lind & Ponack, L.L.P.

(57) ABSTRACT

To perform, with a single circuit, decoding in association with various image encoding systems and improve universality, a coefficient selection processing section selects a DC coefficient and an AC coefficient of an adjacent block adjacent to a decoding target block, a coefficient arithmetic processing section applies arithmetic processing to the selected DC coefficient and AC coefficient, a coefficient comparison processing section calculates, based on the DC coefficient subjected to the arithmetic processing, inter-block correlations in horizontal and vertical directions, and a direction determination processing section determines a predicting method using the inter-block correlations. Further, a prediction processing section adds, using the determined predicting method, the DC coefficient and the AC coefficient subjected to the arithmetic processing to encoded data, and a controlling section controls, according to the encoded data, a selecting method, an arithmetic processing method, a determining method, and/or a prediction processing method.

22 Claims, 9 Drawing Sheets

U.S. PATENT DOCUMENTS

| | | | |
|---|---|---|---|
| 6,100,826 | A | 8/2000 | Jeon et al. |
| 2002/0054709 | A1 | 5/2002 | Kajita et al. |
| 2005/0141610 | A1 | 6/2005 | Isu et al. |
| 2005/0232350 | A1 | 10/2005 | Hamada |
| 2006/0222064 | A1 | 10/2006 | Sherigar et al. |
| 2006/0282237 | A1 | 12/2006 | Xiao et al. |
| 2007/0248162 | A1* | 10/2007 | Haskell et al. ............ 375/240.02 |

FOREIGN PATENT DOCUMENTS

| | | |
|---|---|---|
| EP | 1 708 511 | 10/2006 |
| JP | 2-264584 | 10/1990 |
| JP | 6-125539 | 5/1994 |
| JP | 11-46363 | 2/1999 |
| JP | 2000-253403 | 9/2000 |
| JP | 2001-103472 | 4/2001 |
| JP | 2002-118853 | 4/2002 |
| JP | 2004-336247 | 11/2004 |
| WO | 99/22524 | 5/1999 |

OTHER PUBLICATIONS

Chinese Office Action issued Dec. 14, 2010 in Application No. 200880000646.2.

Lili Zheng, "Design and Implementation for MPEG-4 based Video Decoding Platform", Information Engineering University, Master Degree Paper, Apr. 2005 (along with English translation).

Supplementary European Search Report issued Dec. 27, 2011 in European Application No. EP 08 72 0283.

"Doctor Degree Paper—Design and Study for Multimode Digital Video Decoding SOC Chip" (along with partial English translation), Nov. 2006.

International Search Report issued May 27, 2008 in the International (PCT) Application No. PCT/JP2008/000369.

Tian Song et al., "A Codec of H.263 Advanced Intra Coding mode and it's Architecture", IEICE Technical Report, Oct. 16, 2000, vol. 100, No. 388, pp. 45 to 50, Section 4 (along with English abstract).

* cited by examiner

FIG.4

| ITEM | PROCESSING SYSTEM |
|---|---|
| METHOD OF DETERMINING PREDICTING DIRECTION | if ($\|F_A[0][0]-F_B[0][0]\|<\|F_B[0][0]-F_C[0][0]\|$)<br>　　PREDICT FROM BLOCK C<br>else<br>　　PREDICT FROM BLOCK A |
| PREDICTION OF DC COEFFICIENT | if (PREDICT FROM BLOCK C)<br>　　$QF_X[0][0] = PQF_X[0][0] + F_C[0][0]$ //dc_scaler<br>else<br>　　$QF_X[0][0] = PQF_X[0][0] + F_A[0][0]$ //dc_scaler |
| PREDICTION OF AC COEFFICIENT | WHEN PREDICTING FROM BLOCK C<br>　　$QF_X[0][u] = PQF_X[0][u] + (QF_C[0][u]*QP_C)//QP_X$　　v=1～7<br>WHEN PREDICTING FROM BLOCK A<br>　　$QF_X[v][0] = PQF_X[v][0] + (QF_A[v][0]*QP_A)//QP_X$　　u=1～7 |
| SATURATION PROCESSING | PERFORM CLIPPING TO RANGE OF -2048 TO 2047 |

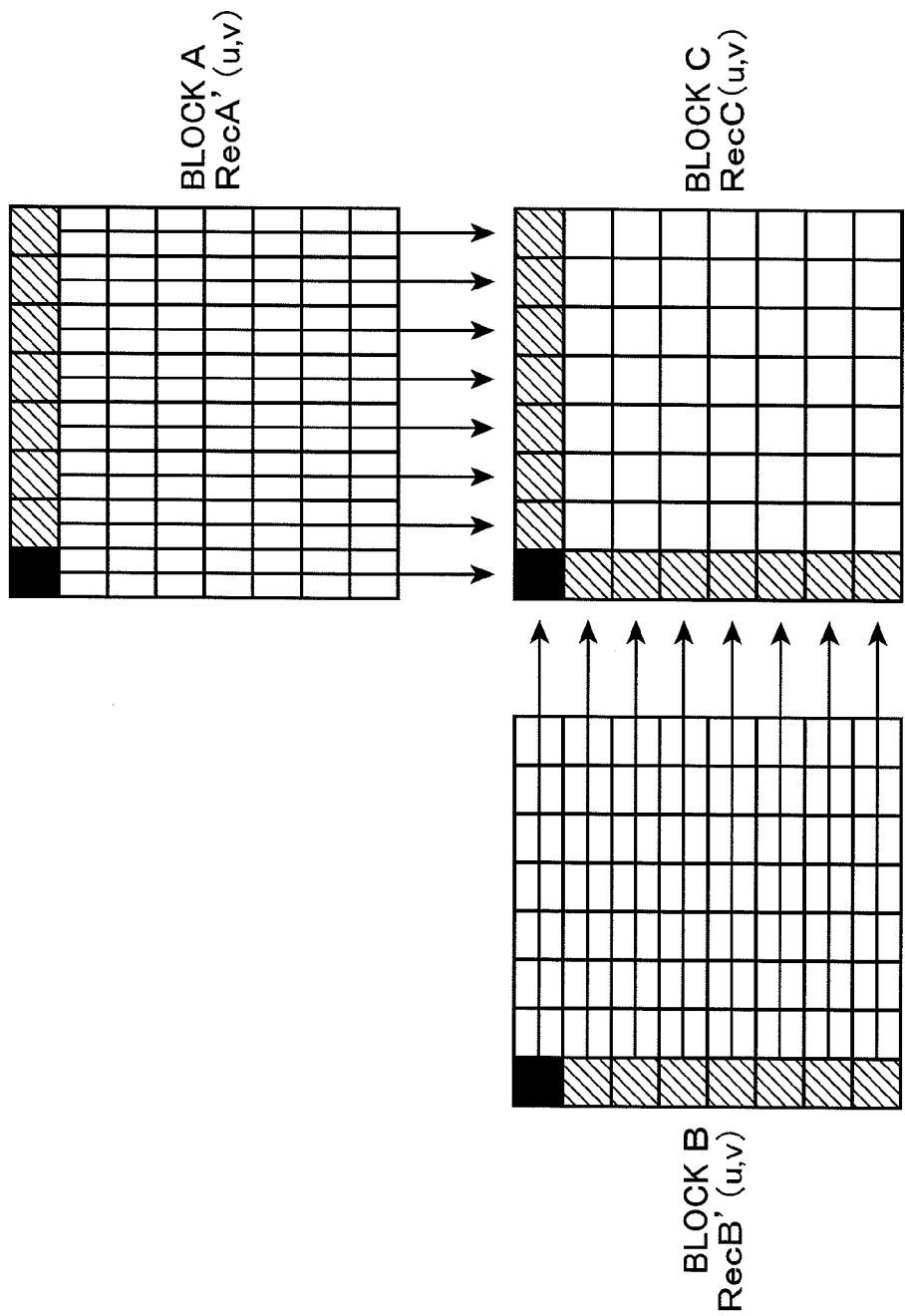

FIG.6

| ITEM | | PROCESSING SYSTEM |
|---|---|---|
| METHOD OF DETERMINING PREDICTING METHOD | | DESIGNATED IN MACRO BLOCK UNIT ACCORDING TO INTRA_MODE |
| PREDICTION OF DC/AC COEFFICIENTS | PREDICTION MODE 0 | RecC'(u,v)=clipAC(RecC(u,v)) (u,v)≠(0,0),u=0~7,v=0~7<br>if (BOTH BLOCKS A/B CAN BE USED) {<br>   tempDC=RecC(0,0)+(RecA'(0,0)+RecB'(0,0))/2<br>} else {<br>   if (BLOCK A CAN BE USED) {<br>     tempDC=RecC(0,0)+RecA'(0,0)<br>   } else {<br>     if (BLOCK B CAN BE USED) {<br>       tempDC=RecC(0,0)+RecB'(0,0)<br>     } else {<br>       tempDC=RecC(0,0)+1024<br>     }<br>   }<br>}<br>RecC'(0,0)=oddifyclipDC(tempDC) |
| | PREDICTION MODE 1 | if (BLOCK A CAN BE USED) {<br>   tempDC=RecC(0,0)+RecA'(0,0)<br>   RecC'(u,0)=clipAC(RecC(u,0)+RecA'(u,0)) u=1~7<br>   RecC'(u,v)=clipAC(RecC(u,v))    u=0~7,v=1~7<br>} else {<br>   tempDC=RecC(0,0)+1024<br>   RecC'(u,v)=clipAC(RecC(u,v))<br>   (u,v)≠(0,0),u=0~7,v=0~7<br>}<br>RecC'(0,0)=oddifyclipDC(tempDC) |
| | PREDICTION MODE 2 | if (BLOCK B CAN BE USED) {<br>   tempDC=RecC(0,0)+RecB'(0,0)<br>   RecC'(0,v)=clipAC(RecC(0,v)+RecB'(0,v)) v=1~7<br>   RecC'(u,v)=clipAC(RecC(u,v))    u=1~7,v=0~7<br>} else {<br>   tempDC=RecC(0,0)+1024<br>   RecC'(u,v)=clipAC(RecC(u,v))<br>   (u,v)≠(0,0),u=0~7,v=0~7<br>}<br>RecC'(0,0)=oddifyclipDC(tempDC) |

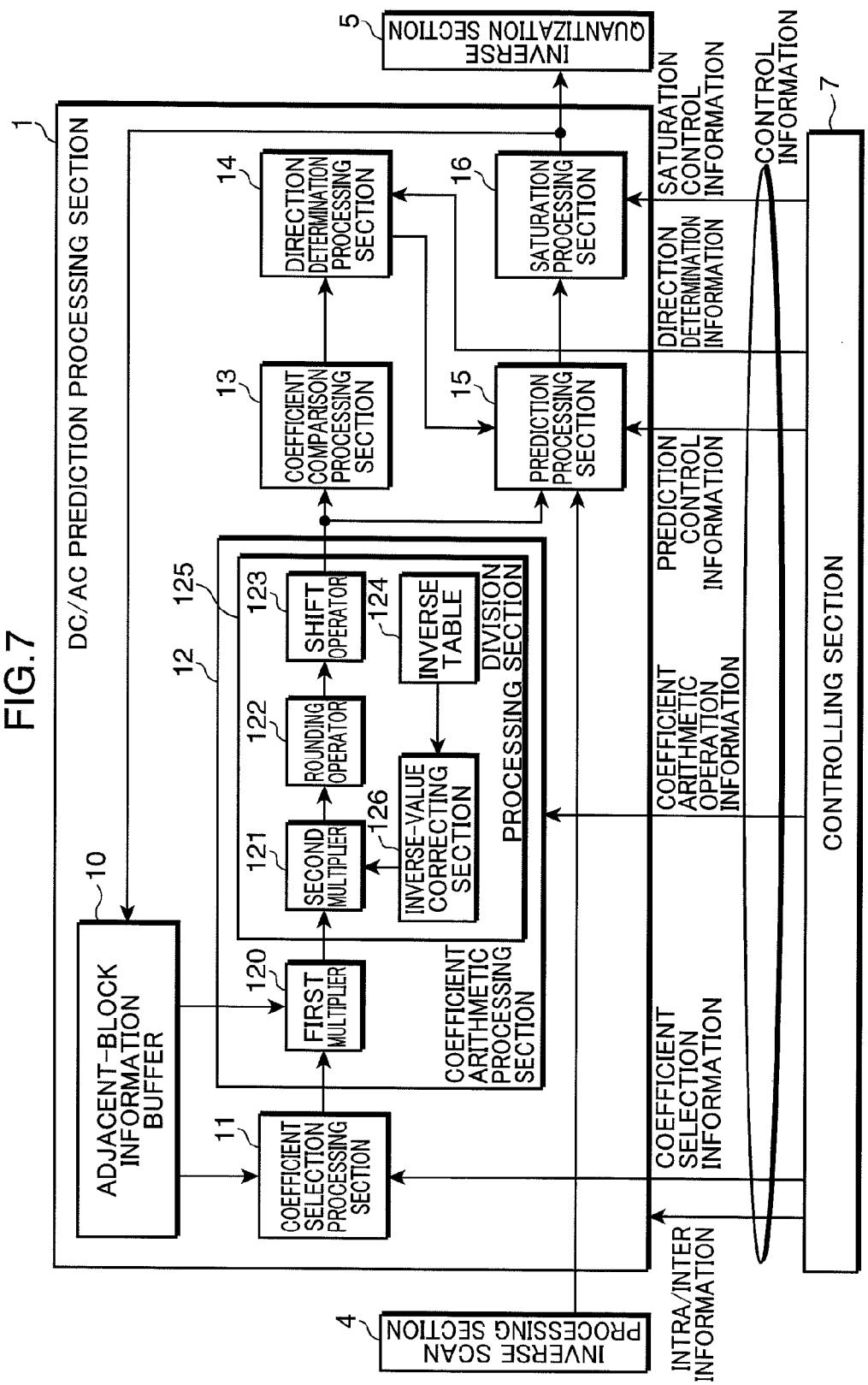

DECODING CIRCUIT, DECODING METHOD, AND IMAGE REPRODUCING APPARATUS

TECHNICAL FIELD

The present invention relates to a decoding circuit that decodes encoded data generated by compression encoding, and, more particularly to a decoding circuit, a decoding method, and an image reproducing apparatus for adaptively predicting coefficient data included in encoded data for both a DC coefficient as a direct current component and an AC coefficient as an alternating current component and decoding the encoded data.

BACKGROUND ART

In recent years, according to an increase in speed of networks and rapid spread of personal computers and digital television receivers to general homes, various multimedia services are widely put to practical use. In particular, digital broadcast systems, content delivery systems using the Internet, and the like, it is a general practice to adopt a form of compression-encoding content data such as video and sound on the basis of standards such as the MPEG (Moving Picture Experts Group) system, setting a fraction of encoded data, which is the compression-encoded content data, as a packet, and transmitting a set of packets as a stream signal, or recording the set of packets in a hard disk, a DVD, a memory card, or the like. An information apparatus such as a personal computer, a set-top box, a portable information terminal apparatus, or a cellular phone, which receives such a stream signal, extracts the encoded data included in the stream signal and applies decoding to the extracted encoded data to restore the content data.

As such a system for compression-encoding an image, there is the JPEG (Joint Photographic Experts Group) system for compression-encoding a still image, which is widely used for a digital camera and the like. As a system for compression-encoding a moving image, there is the MPEG-1 system for recording the moving image in a CD-ROM or the like. Consequently, a basic technique such as an image compression encoding method based on, for example, discrete cosine transform is established. On the basis of such a basic technique, for example, the MPEG-2 system used in digital broadcasts, the MPEG-4 system used for contents provided by using the Internet, and the MPEG-4 AVC system for the purpose of high compression encoding are used as standard systems in a field of treatment of image signals.

A basic algorithm for such image compression encoding is a hybrid compression encoding system in which the discrete cosine transform system, which is one of orthogonal transform systems, is combined with a motion compensation prediction system. In the hybrid compression encoding system, image compression encoding is applied to an image by combining both data obtained by discrete cosine transforming data itself in one picture and data obtained by discrete cosine transforming motion compensation inter-picture prediction data.

In such image compression encoding, the discrete cosine transform is performed in a block unit including a predetermined number of pixels. Respective pixel data forming this block are transformed into plural coefficient values indicating amplitude intensity for each of frequencies from a direct current component to a high-frequency component by the discrete cosine transform. Such respective coefficient values are first quantized by a method based on each compression encoding system to be transformed into quantized coefficient values. Further, the respective quantized coefficient values are rearranged according to a scan pattern indicating order of the respective data in order to improve a compression ratio by variable length encoding. Thereafter, the rearranged respective quantized coefficient values are sequentially subjected to variable length encoding according to the order of the scan pattern.

As such variable length encoding, run level encoding for allocating a unique code to a set of a run, which is the number of preceding zero quantized coefficient values, and a level, which is a non-zero quantized coefficient value, to realize compression of data is used. Compression encoding of an image is performed on the basis of such an algorithm and encoded data including the coefficient data compressed as explained above is generated.

An original image can be restored by applying decoding in association with the compression encoding to the encoded data generated by the compression encoding. In other words, the quantized coefficient values conforming to the order of the scan pattern are restored from the data of the run and the level included in the encoded data. Further, the quantized coefficient values are rearranged according to scan pattern data for the scan pattern in the compression encoding. Consequently, the respective quantized coefficient values arranged in predetermined positions on the block are restored. Further, inverse quantization is applied to these quantized coefficient values and inverse discrete cosine transform is applied to the respective coefficient value restored by the inverse quantization, whereby pixel data in the block unit is restored.

In the MPEG-4 system and the like, in addition to these kinds of encoding, a technique called DC/AC prediction encoding is adopted as a technique for reducing a generated code amount of a block for which intra-picture prediction is performed.

FIG. 9 is a conceptual diagram for explaining the DC/AC prediction encoding. As shown in FIG. 9, in the DC/AC prediction encoding, a DC coefficient as a direct current component of an encoding target block and an AC coefficient in a first row or a first column as an alternating current component are predicted on the basis of a block adjacent above the encoding target block (an upper adjacent block), a block adjacent on the left of the encoding target block (a left adjacent block), or both the upper adjacent block and the left adjacent block. Only a prediction error of the prediction is encoded to hold down an encoded data amount. Besides the MPEG-4 system, such a technique of DC/AC prediction encoding is used in plural encoding systems such as the H.263 system.

Various devices for applying DC/AC prediction decoding to encoded data subjected to such DC/AC prediction encoding have been proposed. For example, in Patent Document 1, a hardware device for performing DC/AC prediction processing for the MPEG-4 system is proposed.

However, in the case of a method of configuring a decoding circuit individually for each of various image encoding systems in association with the image encoding system as the conventional decoding circuit, it is necessary to design a DC/AC prediction circuit individually for the respective image encoding systems. Therefore, there are problems in that, for example, a circuit size is increased and, for example, when a new image encoding system is proposed, it is difficult to quickly cope with the image encoding system and redesign of an LSI (large scale integrated circuit) for performing decoding is necessary.

Patent Document 1: Japanese Patent Application Laid-Open No. 2001-103472

DISCLOSURE OF THE INVENTION

The present invention has been devised in order to solve the problems and it is an object of the present invention to provide a decoding device, a decoding method, and an image reproducing apparatus that can perform, with a single circuit, decoding in association with various image encoding systems and have universality.

A decoding circuit according to an aspect of the present invention is a decoding circuit that decodes encoded data generated by image compression encoding for transforming image data into a coefficient value in a block unit of a predetermined number of pixels, quantizing the transformed coefficient value of each of the blocks at predetermined quantization width, and predicting a DC coefficient as a direct current component and an AC coefficient as an alternating current component of the block on the basis of a block adjacent thereto, the decoding circuit including: a decoded-data storing section that temporarily stores, as adjacent block information, decoded data obtained by applying decoding in the block unit to the encoded data supplied thereto; a coefficient selection processing section that selects, from the adjacent block information stored in the decoded-data storing section, a DC coefficient and an AC coefficient of an adjacent block adjacent to a block to be decoded; a coefficient arithmetic processing section that applies predetermined arithmetic processing to the DC coefficient and the AC coefficient selected by the coefficient selection processing section; a coefficient comparison processing section that calculates inter-block correlations in the horizontal direction and the vertical direction on the basis of the DC coefficient subjected to the predetermined arithmetic processing by the coefficient arithmetic processing section; a determination processing section that determines a predicting method using the inter-block correlations calculated by the coefficient comparison processing section; a prediction processing section that adds, using the predicting method determined by the determination processing section, the DC coefficient and the AC coefficient subjected to the predetermined arithmetic processing by the coefficient arithmetic processing section, to the supplied encoded data; and a controlling section that controls, according to contents of the supplied encoded data, one or plural methods among a selecting method in the coefficient selection processing section, an arithmetic processing method in the coefficient arithmetic processing section, a determining method in the determination processing section, and a prediction processing method in the prediction processing section.

With this configuration, decoded data obtained by applying, in a block unit, the decoding to encoded data supplied thereto is temporarily stored in the decoded-data storing section as adjacent block information. A DC coefficient and an AC coefficient of an adjacent block adjacent to a block to be decoded are selected from the adjacent block information, which is stored in the decoded-data storing section, by the coefficient selection processing section. Predetermined arithmetic processing is applied to the DC coefficient and the AC coefficient, which are selected by the coefficient selection processing section, by the coefficient arithmetic processing section. Inter-block correlations in the horizontal direction and the vertical direction are calculated by the coefficient comparison processing section on the basis of the DC coefficient subjected to the predetermined arithmetic processing by the coefficient arithmetic processing section. Subsequently, a predicting method is determined by the determination processing section by using the inter-block correlations calculated by the coefficient comparison processing section. The DC coefficient and the AC coefficient subjected to the predetermined arithmetic processing by the coefficient arithmetic processing section are added to the supplied encoded data by the prediction processing section by using the predicting method determined by the determination processing section. One or plural methods among the selecting method in the coefficient selection processing section, the arithmetic processing method in the coefficient arithmetic processing section, the determining method in the determination processing section, and the prediction processing method in the prediction processing section are controlled by the controlling section according to contents of the supplied encoded data.

According to the present invention, since one or plural methods among the selecting method in the coefficient selection processing section, the arithmetic processing method in the coefficient arithmetic processing section, the determining method in the determination processing section, and the prediction processing method in the prediction processing section are controlled according to contents of the supplied encoded data, it is possible to provide a decoding device that can perform, with a single circuit, decoding in association with various image encoding systems and has universality. Even if an encoding system employing a new DC/AC prediction processing method is proposed, it is possible to quickly cope with the new DC/AC prediction processing method by changing the processing methods in the respective processing sections according to encoded data. Redesign of an LSI and the like for performing decoding is unnecessary.

Objects, characteristics, and advantages of the present invention will be made apparent by the following detailed explanation and the accompanying drawings.

BRIEF DESCRIPTION OF THE DRAWINGS

FIG. 4 is a diagram showing contents of the DC/AC prediction processing based on the MPEG-4 system;

FIG. 5 is a diagram showing a positional relation between a block to be decoded and an adjacent block in DC/AC prediction processing based on the H.263 system;

FIG. 6 is a diagram showing contents of the DC/AC prediction processing based on the H.263 system;

FIG. 7 is a block diagram showing a configuration of a DC/AC prediction processing section according to a second embodiment of the present invention;

BEST MODE FOR CARRYING OUT THE INVENTION

Embodiments of the present invention are explained below with reference to the accompanying drawings. The embodiments explained below are examples obtained by embodying the present invention and do not limit, it characteristic thereof, a technical scope of the present invention.

First Embodiment

Figure 1:
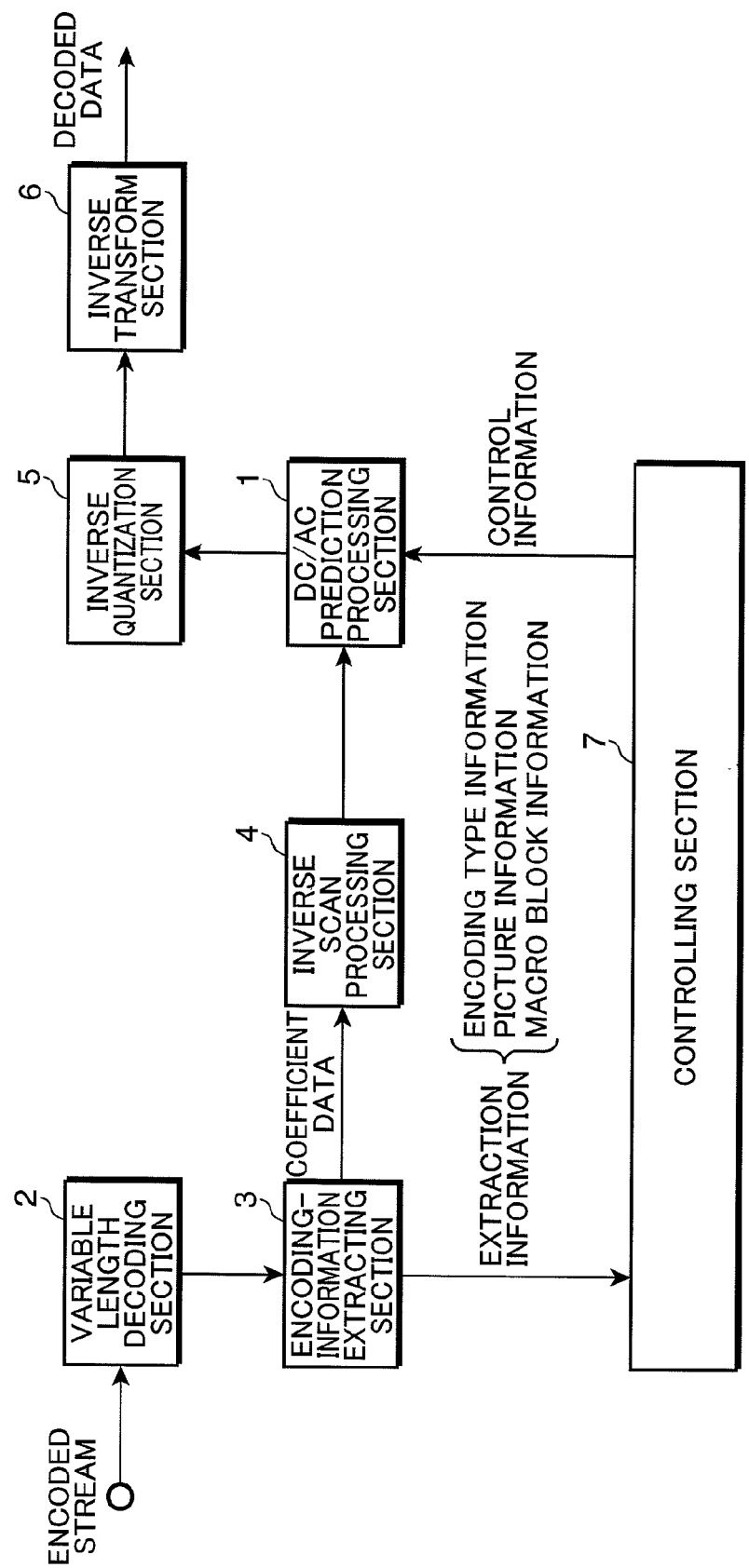
FIG. 1 is a block diagram showing a configuration of a decoding circuit according to a first embodiment of the present invention.

FIG. 1 is a block diagram showing a configuration of a decoding circuit according to a first embodiment of the present invention. In this embodiment, an example of a decoding circuit that acquires an encoded stream including encoded data generated by compression-encoding image data and restores the original image data from the encoded data is explained.

As shown in FIG. 1, an encoded stream including encoded data is supplied to the decoding circuit. The encoded data supplied to the decoding circuit is generated by compression encoding of an image. In the compression encoding of the image, image data is discrete cosine transformed in a block unit of a predetermined number of pixels and respective coefficient values for each of blocks generated by the discrete cosine transform are quantized. DC/AC prediction encoding is applied to the respective quantized coefficient values generated by the quantization. In other words, a DC coefficient as a direct current component and an AC coefficient value in a first column or a first row as an alternating current component are predicted on the basis of a block adjacent above an encoding target block, a block adjacent on the left of the encoding target block, or both the block adjacent above the encoding target block and the block adjacent on the left of the encoding target block. The generated respective quantized coefficient values are rearranged according to a predetermined scan pattern. Variable length encoding is applied to the rearranged quantized coefficient values.

The decoding circuit according to this embodiment restores, with respect to the encoded data generated by such image compression encoding, coefficient data for the quantized coefficient values conforming to order of the scan pattern from variable-length encoded data. The decoding circuit rearranges the restored coefficient data according to the scan pattern to thereby restore the respective coefficient data arranged in predetermined positions on the block.

The decoding circuit applies DC/AC prediction processing to the restored coefficient data. In other words, the decoding circuit predicts a DC coefficient as a direct current component of a decoding target block and an AC coefficient in a first column or a first row as an alternating current component on the basis of a block adjacent above the decoding target block, a block adjacent on the left of the decoding target block, or both the block adjacent above the decoding target block and the block adjacent on the left of the decoding target block.

The decoding circuit applies inverse quantization and inverse transform to the respective coefficient data in the block restored in this way to restore image data for the respective pixels in the block. The decoding circuit outputs the restored image data as decoded data.

In particular, the decoding circuit according to this embodiment is configured to be applicable to the MPEG-4 and H.263 systems for moving images standardized by the international standardization organization as encoding systems for images. The decoding circuit according to this embodiment is configured to be applicable to image encoding systems independently developed by specific companies and countries as well. Further, in addition to these image encoding systems, the decoding circuit according to this embodiment is configured to be applicable to image encoding systems to be proposed in future as well.

In this embodiment, an example in which encoded data encoded by an image encoding system employing discrete cosine transform (DCT), which is one kind of orthogonal transform, is decoded is explained. However, this embodiment is applicable to image encoding systems employing other kinds of transform that use a method of, for example, calculating a component for each frequency from image data. The decoding circuit may be a decoding circuit that decodes encoded data using transform other than such discrete cosine transform.

The decoding circuit shown in FIG. 1 includes a DC/AC prediction processing section 1, a variable length decoding section 2, an encoding-information extracting section 3, an inverse scan processing section 4, an inverse quantization section 5, an inverse transform section 6, and a controlling section 7.

In FIG. 1, an encoded stream input to the decoding circuit is first supplied to the variable length decoding section 2. The variable length decoding section 2 restores a quantized coefficient value and extracted information explained below from encoded data included in the supplied encoded stream. In other words, in the supplied encoded data, for example, the quantized coefficient value is, in general, formed by run-level encoded data. Therefore, first, the variable length decoding section 2 restores run data, which is the number of zero quantized coefficient values, and level data, which is a non-zero quantized coefficient value. Next, the variable length decoding section 2 restores a one-dimensional quantized coefficient row conforming to order of a scan pattern in encoding from the restored run data and level data.

The variable length decoding section 2 sequentially supplies quantized coefficient values restored in this way to the encoding-information extracting section 3 as coefficient data. Similarly, the variable length decoding section 2 restores the extracted information other than the quantized coefficient values as well and supplies the extracted information to the encoding-information extracting section 3.

Next, the encoding-information extracting section 3 extracts information concerning the encoded data for performing decoding as extracted information from the data restored by the variable length decoding section 2. The encoding-information extracting section 3 extracts, as such extracted information, encoding type information, picture information, macro block information, and the like, as information concerning a type of encoded data.

In such extracted information, the encoding type information is information indicating an image encoding system used for generating the encoded data. The picture information is information indicating an encoding method for a presently-supplied encoded picture and includes, for example, picture type information. The picture type information in this context is information indicating in which of intra-picture encoding called I picture, inter-picture forward prediction encoding called P picture, and inter-picture bidirectional prediction encoding called B picture the presently-supplied encoded data is generated in, for example, the MPEG system.

Similarly, the macro block information is information indicating an encoding method for a presently-supplied macro block and the like. The macro block information includes, for example, intra/inter encoding type information indicating which of intra representing that the presently-processed macro block is for the intra-picture encoding and inter or non-intra representing that the presently-processed macro block is for inter-picture encoding, and other information.

The encoding-information extracting section 3 notifies the controlling section 7 of the extracted information extracted from the encoded stream. The encoding-information extracting section 3 sequentially supplies the coefficient data restored by the variable length decoding section 2 to the inverse scan processing section 4.

The inverse scan processing section 4 applies rearrangement to the one-dimensional coefficient data row conforming to the order of the scan pattern according to the scan pattern to thereby restore coefficient data arranged in predetermined positions on a two-dimensional block. The inverse scan processing section 4 supplies the rearranged coefficient data to the DC/AC prediction processing section 1.

The DC/AC prediction processing section 1 is provided to cope with, in particular, the MPEG-4 system, the H.263 system, and the like. In the MPEG-2 system and the like, only direct current components (hereinafter referred to as DC components) of respective blocks in the processing in intra are differential encoded. On the other hand, in the MPEG-4 system and the H.263 system, both DC components and alternating current components (hereinafter referred to as AC components) are adaptively prediction-encoded on the basis of a block adjacent above a decoding target block, a block adjacent on the left of the decoding target block, or both the block adjacent above the decoding target block and the block adjacent on the left of the decoding target block. Consequently, in the MPEG-4 system and the H.263 system, improvement of encoding efficiency of the respective blocks in intra is realized.

Therefore, in the decoding circuit according to this embodiment, when encoded data generated in accordance with an encoding system employing the DC/AC prediction processing such as the MPEG-4 system or the H.263 system is supplied, first, the DC/AC prediction processing section 1 determines a predicting direction for a block to be decoded and calculates a predictor.

Further, the DC/AC prediction processing section 1 restores a DC component and an AC component of supplied coefficient data using the predicting direction and the predictor. In restoring the DC component and the AC component, the DC/AC prediction processing section 1 performs prediction decoding according to control information set by the controlling section 7. The DC/AC prediction processing section 1 supplies the coefficient data subjected to such DC/AC prediction processing to the inverse quantization section 5. When encoded data generated in accordance with an encoding system not employing the DC/AC prediction processing is supplied, the DC/AC prediction processing section 1 does not carry out such DC/AC prediction processing and supplies coefficient data read out from the inverse scan processing section 4 to the inverse quantization section 5.

Next, the inverse quantization section 5 applies inverse quantization to respective coefficient data supplied from the DC/AC prediction processing section 1. Consequently, the inverse quantization section 5 restores coefficient values associated with block elements of the respective blocks. The inverse quantization section 5 sequentially supplies the coefficient values restored in this way to the inverse transform section 6.

Next, the inverse transform section 6 applies, in a block unit, inverse discrete cosine transform (hereinafter referred to as inverse DCT transform) to the respective coefficient values inversely quantized by the inverse quantization section 5 to restore image data for respective pixels in the block. The image data restored by the inverse transform section 6 in this way is outputted as decoded data.

The decoding circuit according to this embodiment performs the DC/AC prediction processing for the various image encoding systems as explained above. Therefore, the controlling section 7 generates, on the basis of the extracted information extracted by the encoding-information extracting section 3, control information necessary for the DC/AC prediction processing and sets the generated control information in the DC/AC prediction processing section 1.

The controlling section 7 generates, on the basis of the extracted information such as the encoding type information, the picture information, and the macro block information, concerning the encoded data extracted by the encoding-information extracting section 3, various kinds of control information necessary for the DC/AC prediction processing section 1 to perform the processing for the various image encoding systems and sets the generated various kinds of control information in the DC/AC prediction processing section 1.

In this way, the decoding circuit according to this embodiment executes the decoding in association with the DC/AC prediction processing in the various encoding systems.

Figure 2:
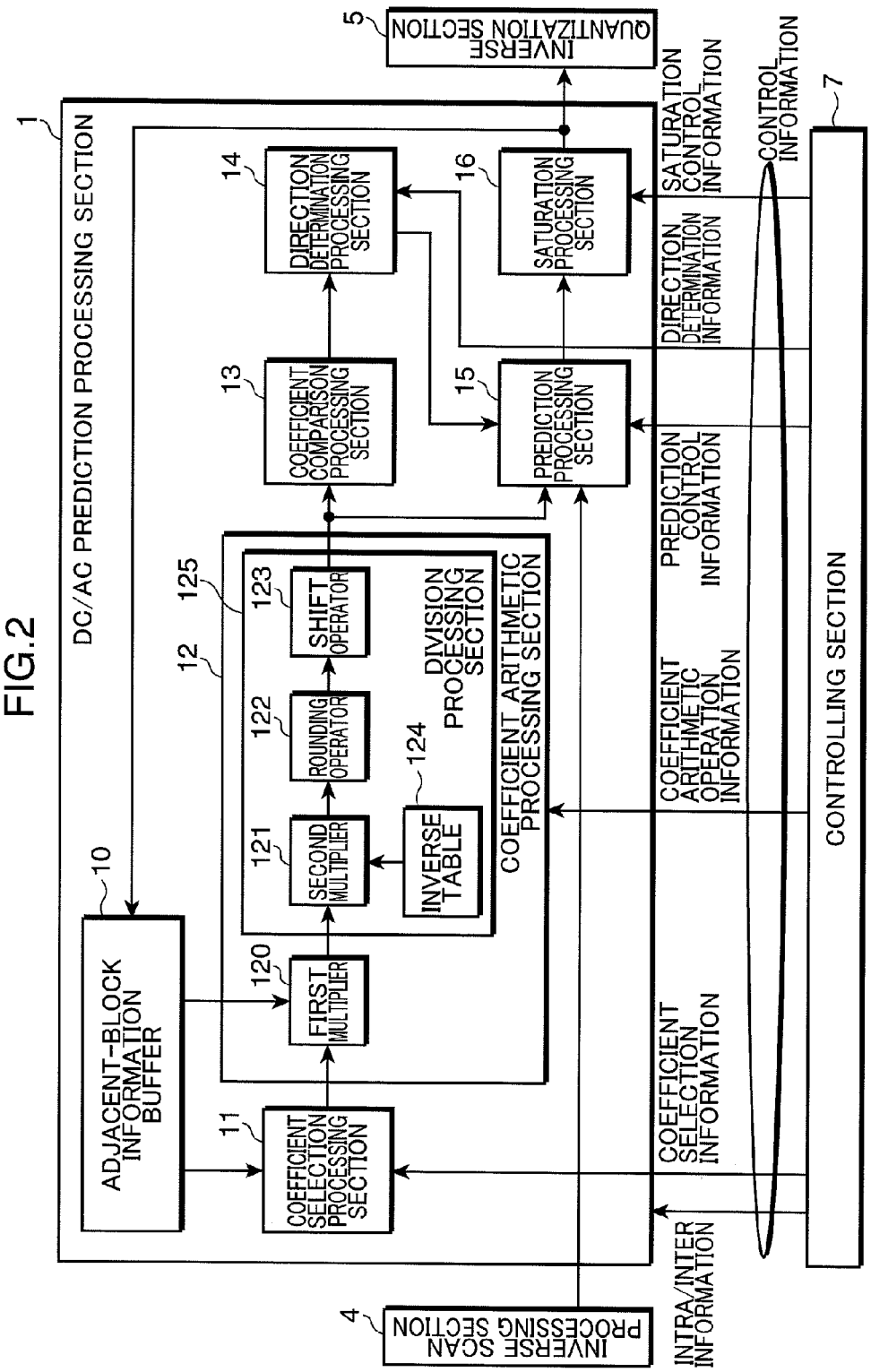
FIG. 2 is a block diagram showing a configuration of a DC/AC prediction processing section shown in FIG. 1.

Next, a configuration of the DC/AC prediction processing section 1 in the decoding circuit according to this embodiment is explained in detail. FIG. 2 is a block diagram showing a configuration of the DC/AC prediction processing section 1 shown in FIG. 1.

As shown in FIG. 2, the DC/AC prediction processing section 1 includes an adjacent-block information buffer 10, a coefficient selection processing section 11, a coefficient arithmetic processing section 12, a coefficient comparison processing section 13, a direction determination processing section 14, a prediction processing section 15, and a saturation processing section 16.

The adjacent-block information buffer 10 temporarily stores information concerning an already-decoded block in order to use the information for the DC/AC prediction processing for a block to be decoded after that. In other words, the adjacent-block information buffer 10 temporarily stores, as adjacent block information, decoded data obtained by applying decoding to supplied encoded data in a block unit.

The coefficient selection processing section 11 selects, from the adjacent block information stored in the adjacent-block information buffer 10, a DC coefficient and an AC coefficient of an adjacent block adjacent to a block to be decoded. In other words, the coefficient selection processing section 11 selects, out of coefficient data of the already-decoded block or predetermined constant values, a data using as a DC coefficient and an AC coefficient of a block adjacent to the block to be decoded (hereinafter referred to as adjacent block).

The coefficient arithmetic processing section 12 applies predetermined arithmetic processing to the DC coefficient and the AC coefficient supplied from the coefficient selection processing section 11. The coefficient comparison processing section 13 calculates inter-block correlations in the horizontal direction and the vertical direction on the basis of the DC coefficient value subjected to the predetermined arithmetic processing by the coefficient arithmetic processing section 12. In other words, the coefficient comparison processing section 13 calculates gradients of DC coefficient values in the horizontal direction and the vertical direction based on the calculated DC coefficient value of the adjacent block supplied from the coefficient arithmetic processing section 12.

The direction determination processing section 14 determines a predicting method using the inter-block correlations calculated by the coefficient comparison processing section 13. In other words the direction determination processing section 14 determines a predicting method (a predicting direction) using the gradients and the like of the DC coefficient calculated by the coefficient comparison processing section 13.

The prediction processing section 15 selects, using the predicting method (the predicting direction) determined by the direction determination processing section 14, the calculated DC coefficient value and the AC coefficient value of the adjacent block supplied from the coefficient arithmetic processing section 12 and adds the DC coefficient value and the AC coefficient value to an encoded data supplied from the inverse scan processing section 4 to restore the coefficients. The saturation processing section 16 applies post-stage processing such as saturation processing to the coefficient values supplied from the prediction processing section 15.

The controlling section 7 controls, according to an encoding system of the supplied encoded data, one or plural methods among a selecting method in the coefficient selection processing section 11, an arithmetic processing method in the coefficient arithmetic processing section 12, a determining method in the direction determination processing section 14, and a prediction processing method in the prediction processing section 15. The respective processing sections are configured such that the selecting method, the determining method, the arithmetic processing method, or the prediction processing method can be selected.

Detailed configurations of the respective processing sections configuring the DC/AC prediction processing section 1 shown in FIG. 2 are explained below.

The adjacent-block information buffer 10 is a buffer for temporarily storing information concerning a block already decoded by the DC/AC prediction processing section 1. The adjacent-block information buffer 10 stores information concerning a block adjacent to a block to be decoded. In other words, the adjacent-block information buffer 10 stores coefficient data and a quantization scale value of the already-decoded block, and the like as adjacent block information. The quantization scale value indicates quantization width set for each of blocks such as macro blocks.

The coefficient selection processing section 11 selects a DC coefficient value and an AC coefficient value of the adjacent block for the DC/AC prediction processing from DC coefficient values and AC coefficient values read out from the adjacent-block information buffer 10 or predetermined constant values. In other words, the coefficient selection processing section 11 is provided for realizing processing for using the predetermined constant values instead of the DC coefficient value and the AC coefficient value of the adjacent block when the adjacent block cannot be used, in particular, in the MPEG-4 system and the like. Coefficient selection information is set in the coefficient selection processing section 11 by the controlling section 7 as control information.

The coefficient selection information includes adjacent block availability information indicating whether blocks adjacent to upper, left, and upper left parts of the block to be decoded are available as prediction information and specified DC coefficient value information and specified AC coefficient value information indicating predetermined constant values instead of a DC coefficient value and an AC coefficient value of a block to be referred to when the blocks cannot be used.

According to these kinds of coefficient selection information, the coefficient selection processing section 11 selects, when the adjacent block is available, the DC coefficient value and the AC coefficient value read out from the adjacent-block information buffer 10 as the DC coefficient value and the AC coefficient value of the adjacent block and selects, when the adjacent block cannot be used, the specified DC coefficient value information and the specified AC coefficient value information as the DC coefficient value and the AC coefficient value of the adjacent block. The selected DC coefficient value and AC coefficient value of the adjacent block is supplied to the coefficient arithmetic processing section 12. At this point, the controlling section 7 indicates to the coefficient selection processing section 11 whether the adjacent block is available.

As explained above, a constant value selected by the coefficient selection processing section 11 can be set on the basis of an instruction from the controlling section 7. In other words, when the adjacent block cannot be used, the predetermined constant values are used instead of the DC coefficient value and the AC coefficient value of the adjacent block. However, as the predetermined constant values, different values are likely to be applied according to encoding systems. Therefore, the controlling section 7 sets the predetermined constant values to be selected by the coefficient selection processing section 11 to values for an encoding system (the specified DC coefficient value and the specified AC coefficient value).

In this way, since the constant value selected by the coefficient selection processing section 11 can be set, the predetermined constant values for an encoding system can be set instead of the DC coefficient and the AC coefficient. The coefficient selection processing section 11 can set constant values for the DC coefficient and the AC coefficient, respectively.

The coefficient arithmetic processing section 12 applies predetermined arithmetic processing to the DC coefficient value and the AC coefficient value of the adjacent block supplied from the coefficient selection processing section 11. When the DC/AC prediction processing is performed, when a quantization scale value of the adjacent block and a quantization scale value of the block to be decoded are different, the DC coefficient and the AC coefficient of the decoding target block cannot be efficiently prediction-decoded from the adjacent block. Therefore, the coefficient arithmetic processing section 12 applies an arithmetic operation for adjusting scales of coefficients of the respective blocks (hereinafter referred to as "scaling operation"). The scaling operation is performed by, after multiplying the DC coefficient value and the AC coefficient value of the adjacent block with the quantization scale value of the adjacent block, dividing the multiplied DC coefficient value and AC coefficient value by the quantization scale value of the decoding target block.

As an example for realizing such a scaling operation, the coefficient arithmetic processing section 12 in the decoding circuit according to this embodiment includes a first multiplier 120 and a division processing section 125. The first multiplier 120 multiplies the DC coefficient and the AC coefficient of the adjacent block selected by the coefficient selection processing section 11 with a quantization scale value indicating quantization width of a block including the DC coefficient and the AC coefficient of the adjacent block (hereinafter referred to as first quantization scale value). The division processing section 125 divides the DC coefficient and the AC coefficient multiplied with the first quantization scale value by the first multiplier 120 by a quantization scale value indicating quantization width of the block to be decoded (hereinafter referred to as second quantization scale value).

The division processing section 125 includes a second multiplier 121, a rounding operator 122, a shift operator 123, and an inverse table 124. The second multiplier 121 multiplies the DC coefficient and the AC coefficient multiplied with the first quantization scale value by the first multiplier 120 with an inverse value of the second quantization scale value of the decoding target block. The rounding operator 122 performs rounding processing by adding a rounding value to the DC coefficient and the AC coefficient multiplied with the inverse value by the second multiplier 121.

The shift operator 123 applies, by a predetermined shift amount, right bit shift processing to the DC coefficient and the AC coefficient subjected to the rounding processing by the rounding operator 122. The inverse table 124 stores plural inverse values for the second quantization scale value of the decoding target block. In this way, in the coefficient arithmetic processing section 12 in the decoding circuit according to this embodiment, division processing in the scaling operation is realized by multiplying the DC coefficient and the AC coefficient with an inverse of a divisor.

Coefficient arithmetic operation information is set in the coefficient arithmetic processing section 12 as control information by the controlling section 7. The coefficient arithmetic operation information includes scaling operation implementation/non-implementation information indicating whether the respective arithmetic operations in the scaling operation are carried out, inverse value information indicating inverses of respective values in a range that the quantization scale value can take, and inverse value accuracy information indicating accuracy of an inverse value. The coefficient arithmetic processing section 12 applies, according to the coefficient arithmetic operation information, the scaling operation to the DC coefficient value and the AC coefficient value of the adjacent block supplied from the coefficient selection processing section 11.

The controlling section 7 instructs the first multiplier 120, the second multiplier 121, the rounding operator 122, and the shift operator 123 whether the devices should perform predetermined arithmetic operations, respectively. The first multiplier 120, the second multiplier 121, the rounding operator 122, and the shift operator 123 select calculated values subjected to the arithmetic operations or uncalculated values not subjected to the arithmetic operations.

The controlling section 7 instructs, according to a type of a coefficient value (coefficient data), the first multiplier 120, the second multiplier 121, the rounding operator 122, and the shift operator 123 whether the respective devices should perform the predetermined arithmetic operations. The first multiplier 120, the second multiplier 121, the rounding operator 122, and the shift operator 123 select calculated values or uncalculated values according to the type of the coefficient value (coefficient data). For example, in the H.263 system, unlike the MPEG-4 system, the scaling operation for the adjacent block is not performed. Therefore, it is possible to select, according to the type of the coefficient data, i.e., in which kind of encoding system the coefficient data is encoded, whether the respective processing sections in the coefficient arithmetic processing section 12 should perform arithmetic processing.

In other words, when it is set by the scaling operation implementation/non-implementation information that the multiplication processing according to the first quantization scale value of the adjacent block is performed, the first multiplier 120 multiplies the DC coefficient value and the AC coefficient value of the adjacent block supplied from the coefficient selection processing section 11 with the first quantization scale value of the adjacent block read out from the adjacent-block information buffer 10 and outputs the multiplied DC coefficient value and AC coefficient value to the second multiplier 121. Conversely, when it is set by the scaling operation implementation/non-implementation information that the multiplication processing according to the first quantization scale value of the adjacent block is not performed, the first multiplier 120 does not perform any arithmetic processing and directly outputs the DC coefficient value and the AC coefficient value of the adjacent block supplied from the coefficient selection processing section 11 to the second multiplier 121.

When it is set by the scaling operation implementation/non-implementation information that the division processing according to the second quantization scale value of the decoding target block is performed, the second multiplier 121 multiplies the DC coefficient value and the AC coefficient value supplied from the first multiplier 120 with the inverse value read out from the inverse table 124 according to the second quantization scale value of the decoding target block and outputs the multiplied DC coefficient value and AC coefficient value to the rounding operator 122. Conversely, when it is set by the scaling operation implementation/non-implementation information that the division processing according to the second quantization scale value of the decoding target block is not performed, the second multiplier 121 does not perform any arithmetic operation and directly outputs the DC coefficient value and the AC coefficient value supplied from the first multiplier 120 to the rounding operator 122.

When it is set by the scaling operation implementation/non-implementation information that the rounding processing is performed, the rounding operator 122 adds a rounding value conforming to the inverse value accuracy information to the DC coefficient value and the AC coefficient value supplied from the second multiplier 121 and outputs the DC coefficient value and the AC coefficient value to the shift operator 123. Conversely, when it is set by the scaling operation implementation/non-implementation information that the rounding processing is not performed, the rounding operator 122 does not perform any arithmetic processing and directly outputs the DC coefficient value and the AC coefficient value supplied from the second multiplier 121 to the shift operator 123.

When it is set by the scaling operation implementation/non-implementation information that the right bit shift processing is performed, the shift operator 123 applies the right bit shift processing conforming to the inverse value accuracy information to the DC coefficient value and the AC coefficient value supplied from the rounding operator 122. Conversely, when it is set by the scaling operation implementation/non-implementation information that the right bit shift processing is not performed, the shift operator 123 does not perform any arithmetic processing and directly outputs the DC coefficient value and the AC coefficient value supplied from the rounding operator 122.

The inverse table 124 is configured by a memory such as an SRAM (Static Random Access Memory). The inverse value of the second quantization scale value set by the inverse value information is stored in the inverse table 124. For example, in the MPEG-4 system and the like, a value of dc_scaler used as the second quantization scale value can take values "1" to "46". Therefore, inverses of these values are stored in the inverse table 124. Necessary arithmetic operation accuracy for the inverse value of the second quantization scale value used here may be different according to an encoding system and the like. Therefore, setting is performed according to the inverse value information to meet the necessary arithmetic operation accuracy. The inverse table 124 supplies the inverse value for the second quantization scale value of the decoding target block to the second multiplier 121.

As explained above, in the coefficient arithmetic processing section 12, the multiplication processing according to the first quantization scale value of the adjacent block and the division processing according to the second quantization scale value of the decoding target block in the scaling operation are realized. The DC coefficient value and the AC coefficient value of the adjacent block subjected to the scaling operation by the coefficient arithmetic processing section 12 are supplied to the coefficient comparison processing section 13 and the prediction processing section 15.

In this embodiment, the respective arithmetic operations in the coefficient arithmetic processing section 12 is adapted to switch whether the arithmetic operations are performed according to the coefficient arithmetic operation information (the scaling operation implementation/non-implementation information). However, the present invention is not limited to this. The controlling section 7 may instruct the first multiplier 120, the second multiplier 121, the rounding operator 122, and the shift operator 123 whether the predetermined arithmetic operations should be performed according to a relation between the first quantization scale value and the second quantization scale value. The first multiplier 120, the second multiplier 121, the rounding operator 122, and the shift operator 123 may select the calculated value or the uncalculated value according to the relation between the first quantization scale value and the second quantization scale value.

Specifically, when the second quantization scale value of the block to be decoded and the first quantization scale value of the adjacent block are equal, decoding efficiency does not fall even if the scaling operation is not performed. Therefore, the coefficient arithmetic processing section 12 may be configured to switch, according to the second quantization scale value of the block to be decoded and the first quantization scale value of the adjacent block or contents of information similar to the quantization scale values, whether the respective arithmetic operations should be performed.

The controlling section 7 may set the inverse value in the second multiplier 121, the rounding value in the rounding operator 122, and the right bit shift amount in the shift operator 123. In this case, the controlling section 7 determines the inverse value, the rounding value, and the right bit shift amount according to a type of a coefficient value (coefficient data) and sets the inverse value, the rounding value, and the right bit shift amount in the second multiplier 121, the rounding operator 122, and the shift operator 123.

The coefficient comparison processing section 13 compares DC coefficient values of plural adjacent blocks subjected to the scaling operation supplied from the coefficient arithmetic processing section 12 to calculate correlations among the blocks in the horizontal direction and the vertical direction.

Specifically, at first, coefficient comparison processing section 13 calculates, after calculating a difference between a DC coefficient value of a block adjacent to an upper left part of a block to be decoded and a DC coefficient value of a block adjacent on the left of the block to be decoded, an absolute value of the difference to calculate a vertical direction correlation degree. The vertical direction correlation degree represents how strong correlation the blocks around the block to be decoded have in the vertical direction. A smaller value of the vertical direction correlation degree indicates that the correlation is strong.

Next, the coefficient comparison processing section 13 calculates, after calculating a difference between the DC coefficient value of the block adjacent on the upper left part of the block to be decoded and a DC coefficient value of a block adjacent above the block to be decoded, an absolute value of the difference to calculate a horizontal direction correlation degree. The horizontal direction correlation degree represents how strong correlation the blocks around the block to be decoded have in the horizontal direction. A smaller value of the horizontal direction correlation degree indicates that the correlation is strong.

Further, the coefficient comparison processing section 13 compares the vertical direction correlation degree and the horizontal direction correlation degree calculated in this way to determine in which of the vertical direction and the horizontal direction the correlation is strong. It is seen that the correlation in the horizontal direction is strong if the horizontal direction correlation degree is smaller than the vertical direction correlation degree and, conversely, the correlation in the vertical direction is strong if the vertical direction correlation degree is smaller than the horizontal direction correlation degree. It is seen that the correlation in the horizontal direction and the correlation in the vertical direction are the same degree if the horizontal direction correlation degree and the vertical direction correlation degree are equal. The determination result is supplied to the direction determination processing section 14 as coefficient comparison result information.

The direction determination processing section 14 determines a predicting direction and a predicting method in the DC/AC prediction processing based on the coefficient comparison result information supplied from the coefficient comparison processing section 13, the direction determination information set as the control information by the controlling section 7, and the like. The direction determination information set by the controlling section 7 includes predicting method determination information indicating whether a predicting direction and a predicting method are determined by using the coefficient comparison result information calculated by the coefficient comparison processing section 13 or the DC/AC prediction processing is performed according to predetermined set predicting direction and predicting method and predicting method judgment information indicating according to what kind of rule a predicting direction and a predicting method are determined when a predicting direction and a predicting method are determined by using the coefficient comparison result information calculated by the coefficient comparison processing section 13.

The direction determination processing section 14 is configured to be capable of performing control for switching, according to content of the direction determination information, whether a predicting direction and a predicting method are determined from the coefficient comparison result information calculated by the coefficient comparison processing section 13 or a predicting direction and a predicting method directly designated by extracted information such as an INTRA_MODE syntax specified by the H.263 system are used.

For example, when it is set by the predicting method determination information that the coefficient comparison result information calculated by the coefficient comparison processing section 13 is not used and the directly-designated predicting direction and predicting method are used, the direction determination processing section 14 directly determines the contents set in the predicting method determination information as a predicting direction and a predicting method. At this point, the controlling section 7 directly indicates to the direction determination processing section 14 the predicting direction and the predicting method as the predicting method determination information.

For example, conversely, when it is set by the predicting method determination information that a predicting direction and a predicting method are determined from the coefficient comparison result information calculated by the coefficient comparison processing section 13, the direction determination processing section 14 operates to determine a predicting direction and a predicting method using the coefficient comparison result information calculated by the coefficient comparison processing section 13 and the predicting method judgment information set by the controlling section 7. In this case, for example, when the horizontal direction correlation degree is smaller than the vertical direction correlation degree in the coefficient comparison result information, the direction determination processing section 14 determines, assuming that a correlation is stronger in the horizontal direction than in the vertical direction, a predicting direction to perform prediction from the block adjacent on the left of the block to be decoded. When the vertical direction correlation degree is smaller than the horizontal direction correlation degree in the coefficient comparison result information, the direction determination processing section 14 determines, assuming that a correlation is stronger in the vertical direction than in the horizontal direction, a predicting direction to perform prediction from the block adjacent above the block to be decoded.

When the horizontal direction correlation degree and the vertical direction correlation degree are equal in the coefficient comparison result information, a correlation in the horizontal direction and a correlation in the vertical direction are the same. For example, in the MPEG-4 system and the like, it is specified to perform prediction from the left direction when a correlation in the horizontal direction and a correlation in the vertical direction are equal. However, in encoding systems to be proposed in future, it is considered likely that other predicting direction and predicting method are used when a correlation in the horizontal direction and a correlation in the vertical direction are equal. As an example for coping with such encoding systems in future, the direction determination processing section 14 in the decoding circuit according to this embodiment is configured to determine, when a correlation in the horizontal direction and a correlation in the vertical direction are equal, a predicting direction and a predicting method according to the predicting method judgment information set by the controlling section 7.

At this point, the controlling section 7 gives the direction determination processing section 14 the predicting method determination information indicating that a predicting method should be determined using the inter-block correlation calculated by the coefficient comparison processing section 13. The controlling section 7 gives the direction determination processing section 14 the predicting method judgment information indicating which of the horizontal direction and the vertical direction prediction should be performed from when a correlation in the horizontal direction and a correlation in the vertical direction are equal in the inter-block correlation calculated by the coefficient comparison processing section 13.

When the block adjacent above or on the left of the block to be decoded cannot be used, prediction cannot be efficiently performed from the block. Therefore, in the encoding systems to be proposed in future, it is also conceivable to fixedly determine a predicting method from a available adjacent block. To make it possible to cope with such encoding systems, the predicting method judgment information may be adapted to designate a predicting direction and a predicting method in the case in which an adjacent block cannot be used.

The predicting direction and the predicting method determined as explained above are supplied to the prediction processing section 15 as prediction information.

The prediction processing section 15 adds a DC coefficient value and an AC coefficient value of the adjacent block supplied from the coefficient arithmetic processing section 12 to coefficient data supplied from the inverse scan processing section 4 to restore the DC coefficient and the AC coefficient of the block to be decoded. The prediction control information is set in the prediction processing section 15 as control information by the controlling section 7. The prediction control information includes AC coefficient prediction implementation/non-implementation information indicating whether prediction processing should be applied to the AC coefficient value, and the like. The prediction processing section 15 restores the DC coefficient and the AC coefficient according to the prediction control information and the prediction information supplied from the direction determination processing section 14. At this point, the controlling section 7 instructs the prediction processing section 15 whether an arithmetic operation in the prediction processing section 15 should be performed according to a type of a coefficient value.

In other words, for example, when it is designated by the prediction information that prediction is performed from the block adjacent above the block to be decoded, firstly, the prediction processing section 15 adds a DC coefficient value of the block adjacent above the block to be decoded, which is supplied from the coefficient arithmetic processing section 12, to a DC coefficient of the coefficient data supplied from the inverse scan processing section 4 to restore the DC coefficient.

When it is further set by the AC coefficient prediction implementation/non-implementation information that prediction of an AC coefficient is carried out, subsequently, the prediction processing section 15 adds an AC coefficient value in a first row of the block adjacent above the block to be decoded, which is supplied from the coefficient arithmetic processing section 12, to an AC coefficient in a first row of the coefficient data supplied from the inverse scan processing section 4 to restore the AC coefficient. Conversely, when it is set by the AC coefficient prediction implementation/non-implementation information that prediction of an AC coefficient is not carried out, the prediction processing section 15 does not apply any processing to the AC coefficient in the first row of the coefficient data supplied from the inverse scan processing section 4.

Although detailed explanation in the case in which other prediction information is designated is omitted, as in the above explanation, restoration of a DC coefficient and an AC coefficient is performed according to the prediction control information set by the controlling section 7 and the prediction information supplied from the direction determination processing section 14. The DC coefficient and the AC coefficient restored in this way are supplied to the saturation processing section 16.

As explained above, the prediction processing section 15 selects, according to a type of a coefficient value, a calculated value subjected to an arithmetic operation for adding a DC coefficient and an AC coefficient subjected to the predetermined arithmetic processing by the coefficient arithmetic processing section 12 to the supplied encoded data or an uncalculated value not subjected to the arithmetic operation.

When the DC coefficient value and the AC coefficient value supplied from the prediction processing section 15 are equal to or larger than predetermined values or equal to or smaller than predetermined values, the saturation processing section 16 performs saturation processing for clipping the DC coefficient value and the AC coefficient value to the predetermined values.

In addition, the saturation processing section 16 according to this embodiment performs oddifying processing by applying a predetermined arithmetic operation to the DC coefficient value supplied from the prediction processing section 15. In particular, this is provided to realize oddifying processing performed in an oddifyclipDC( ) function specified in the H.263 system. This oddifying processing is processing performed to cope with an inverse DCT mismatch problem in which image encoded by an encoder and image decoded by a decoder are different according to a difference in an arithmetic operation system of inverse DCT between the encoder and the decoder and, as a result, errors are accumulated. For example, in the case of the H.263 system, when a restored DC coefficient value is an even number, arithmetic processing for adding 1 to the value and oddifying the value is performed.

In the saturation processing section 16, saturation control information is set as control information by the controlling section 7. The saturation control information includes clipping control information indicating a range of clipping and whether the clipping should be carried out and oddifying processing implementation/non-implementation information indicating whether the oddifying processing should be performed. At this point, the controlling section 7 sets the range of the clipping in the saturation processing section according to the clipping control information. The controlling section 7 instructs the saturation processing section 16 whether the oddifying processing should be performed by applying the predetermined arithmetic operation to a DC coefficient.

For example, when it is set by the oddifying processing implementation/non-implementation information that the oddifying processing is not performed, the saturation processing section 16 operates not to perform the oddifying processing. For example, conversely, when it is set by the oddifying processing implementation/non-implementation information that the oddifying processing is performed, the saturation processing section 16 applies the oddifying processing to the restored DC coefficient value. For example, when it is set by the clipping control information that the clipping processing is not performed, the saturation processing section 16 does not perform the saturation processing and directly outputs the DC coefficient value and the AC coefficient value supplied from the prediction processing section 15. For example, when it is set by the clipping control information that the clipping processing is performed in the predetermined range, the saturation processing section 16 performs the saturation processing such that the DC coefficient value and the AC coefficient value supplied from the prediction processing section 15 fit in a set range.

As explained above, the saturation processing section may perform the oddifying processing by applying the predetermined arithmetic operation to the DC coefficient and select a processed value subjected to the oddifying processing or an unprocessed value not subjected to the oddifying processing.

The DC coefficient value and the AC coefficient value subjected to the processing in the saturation processing section 16 as explained above are supplied from the DC/AC prediction processing section 1 to the inverse quantization section 5 and written in the adjacent-block information buffer 10 to be used as adjacent block information in blocks after the block to be decoded.

The controlling section 7 separately sets intra/inter information in the DC/AC prediction processing section 1 as control information representing whether a macro block or a block to be decoded is intra-encoded or inter-encoded.

When the macro block or the block to be decoded is intra-encoded according to the intra/inter information, the DC/AC prediction processing section 1 operates to perform the DC/AC prediction processing in the respective processing sections. On the other hand, when the macro block or the block to be decoded is inter-encoded, the DC/AC prediction processing section 1 does not perform the DC/AC prediction processing in the respective processing sections and directly outputs the DC coefficient and the AC coefficient supplied from the inverse scan processing section 4 to the inverse quantization section 5.

The decoding circuit according to this embodiment has the configuration explained above. With such a configuration, it is possible to perform, with a single circuit, the decoding in association with the DC/AC prediction processing in the various image encoding systems.

In this embodiment, the adjacent-block information buffer 10 corresponds to an example of the decoded-data storing section, the coefficient selection processing section 11 corresponds to an example of the coefficient selection processing section, the coefficient arithmetic processing section 12 corresponds to an example of the coefficient arithmetic processing section, the coefficient comparison processing section 13 corresponds to an example of the coefficient comparison processing section, the direction determination processing section 14 corresponds to an example of the determination processing section, the prediction processing section 15 corresponds to an example of the prediction processing section, the controlling section 7 corresponds to an example of the controlling section, the first multiplier 120 corresponds to an example of the first multiplication processing section, the division processing section 125 corresponds to an example of the division processing section, the inverse table 124 corresponds to an example of the inverse-value storing section, the second multiplier 121 corresponds to an example of the second multiplication processing section, the rounding operator 122 corresponds to an example of the rounding processing section, the shift operator 123 corresponds to an example of the shift processing section, and the saturation processing section 16 corresponds to an example of the saturation processing section.

Next, details of the DC/AC prediction processing specified in the respective image encoding systems are explained with reference to FIGS. 3 to 6. First, details of the DC/AC prediction processing in the MPEG-4 system are explained.

Figure 3:
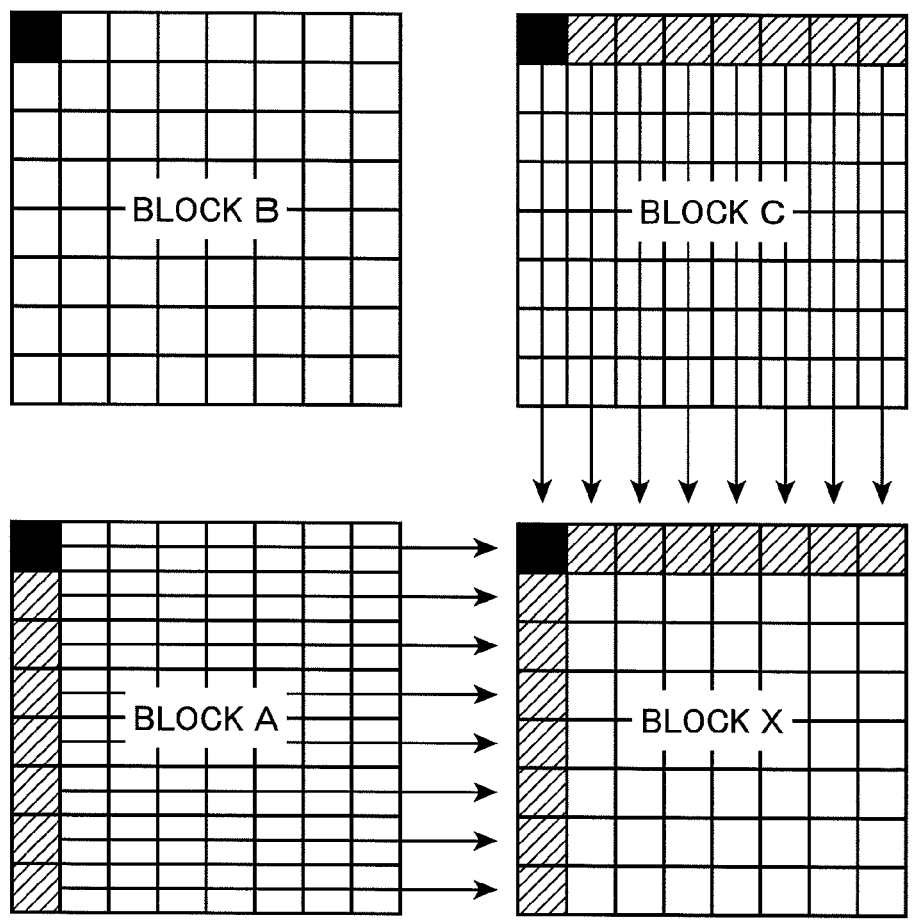
FIG. 3 is a diagram showing a positional relation between a block to be decoded and an adjacent block in DC/AC prediction processing based on the MPEG-4 system.

FIG. 3 is a diagram showing a positional relation between a block to be decoded and an adjacent block in the DC/AC prediction processing based on the MPEG-4 system. As shown in FIG. 3, in the MPEG-4 system, a block to be decoded is defined as "block X", a block adjacent on the left of the block to be decoded is defined as "block A", a block adjacent on the upper left is defined as "block B", and a block adjacent above is defined as "block C". A DC coefficient and an AC coefficient in a first column or a first row of the block X to be decoded are predicted on the basis of the block A and the block C.

FIG. 4 is a diagram showing contents of the DC/AC prediction processing based on the MPEG-4 system. In FIG. 4, a symbol PQF represents a coefficient value before the DC/AC prediction processing is performed, a symbol QF represents a coefficient value after the DC/AC prediction processing is performed, a symbol F represents a coefficient value after the inverse quantization processing is further applied to the coefficient value after the DC/AC prediction processing, a symbol dc_scaler represents a quantization scale value with respect to the DC coefficient, and a symbol QP represents a quantization scale value with respect to the AC coefficient. A subscript added to each of the symbol represents to which blocks the symbol belongs. Indexes following the subscripts represent positions of the coefficient values in the blocks. For example, $F_A[0][0]$ indicates the DC coefficient value after the inverse quantization in the block A.

In the MPEG-4 system, it is determined, by calculating correlations in the vertical direction and the horizontal direction from an inverse-quantized DC coefficient value of an already-decoded adjacent block, whether the block X to be decoded is predicted from the upper direction, i.e., the block C or predicted from the left direction, i.e., the block A. In other words, if ($|F_A[0][0]-F_B[0][0]|<|F_B[0][0]-F_C[0][0]|$), the block X is predicted from the block C assuming that the correlation in the vertical direction is strong.

Otherwise, i.e., if ($|F_A[0][0]-F_B[0][0]|\geq|F_B[0][0]-F_C[0][0]|$), the block X is predicted from the block A. In this way, in the MPEG-4 system, when ($|F_A[0][0]-F_B[0][0]|=|F_B[0][0]-F_C[0][0]|$), it is specified that the block X is predicted from the block A in the left direction. The prediction of the DC coefficient and the AC coefficient in the first column or the first row of the block X is performed according to the predicting direction determined in this way.

The prediction of the DC coefficient is performed by adding, to a DC coefficient value $PQF_X[0][0]$ of the block X, a value obtained by dividing an inverse-quantized DC coefficient value of the block A or the block C, i.e., $F_A[0][0]$ or $F_C[0][0]$, by the quantization scale value dc_scaler of the block X. The inverse-quantized DC coefficient value of the block A or the block C, i.e., $F_A[0][0]$ or $F_C[0][0]$, is a value obtained by multiplying a coefficient value $QF_A[0][0]$ or $QF_C[0][0]$ after the DC/AC prediction processing with the quantization scale value dc_scaler of the block A or the block C. This means that the scaling operation is applied to the coefficient value $QF_A[0][0]$ or $QF_C[0][0]$ after the DC/AC prediction processing of the block A or the block C. A symbol "//" in FIG. 4 indicates a division with rounding.

On the other hand, the prediction of the AC coefficient value is performed by adding, to an AC coefficient value $PQF_X[v][0]$ or $PQF_X[0][u]$ of the block X, a value obtained by multiplying an AC coefficient value $QF_A[v][0]$ or $QF_C[0][u]$ after the DC/AC prediction processing of the block A or the block C with a quantization scale value of the block A or the block C, i.e., $QP_A$ or $QP_C$ and dividing the multiplied value by a quantization scale value $QP_X$ of the block X. In this way, as in the prediction of the DC coefficient value, the scaling operation is applied to the coefficient value $QF_A[v][0]$ or $QF_C[0][u]$ after the DC/AC prediction processing of the block A or the block C as well. However, when ac_pred_flag information included in an encoded stream is "0", the prediction of an AC coefficient is not performed and only the prediction of a DC coefficient is performed. The ac_pred_flag information is information representing whether the prediction of an AC coefficient is performed.

When the block adjacent to the block to be decoded cannot be used, a constant value ($2^{bits\_per\_pixel+2}$) is used instead of a symbol F[0][0] representing a DC coefficient value after the inverse quantization processing is performed. In most cases, bits_per_pixel is "8". Therefore, "1024" is used as a constant value. Similarly, a constant value "0" is used instead of the AC coefficient values $QF_A[v][0]$ and $QF_C[0][u]$ after the DC/AC prediction processing is performed. "When the adjacent block cannot be used" means that the adjacent block is out of a boundary of a VOP (Video Object Plane) or a video packet or the adjacent block is not intra-encoded.

Finally, the saturation processing is applied to the coefficient value subjected to the DC/AC prediction processing in this way. The saturation processing in the MPEG-4 system is performed by clipping the coefficient value to a range of −2048 to 2047.

In the MPEG-4 system, as a result of decoding the encoded stream, an internal flag called short_video_header information is derived. The short_video_header information includes information representing whether the DC/AC prediction processing should be performed. When the short_video_header information is "1", the DC/AC prediction processing explained above is not performed. When the short_video_header information is "0", the DC/AC prediction processing is performed.

Next, details of the DC/AC prediction processing in the H.263 system are explained.

In the H.263 system, in addition to a technique as a basis for encoding, plural selectable option tools for the purpose of performance improvement and function improvement are specified. As one of the option tools, an Advanced INTRA Coding mode is defined as ANNEX I. The Advanced INTRA Coding mode realizes improvement of encoding efficiency by correcting an encoding method for an intra-encoded macro block. Plural methods including the DC/AC prediction processing are used in Advanced INTRA Coding mode. The DC/AC prediction processing is performed when the use of this Advanced INTRA Coding mode is notified.

FIG. 5 is a diagram showing a positional relation between a block to be decoded and an adjacent block in the DC/AC prediction processing based on the H.263 system. As shown in FIG. 3, in the H.263 system, the block to be decoded is defined as "block C", a block adjacent on the left of the block to be decoded is defined as "block B", and a block adjacent above is defined as "block A". A DC coefficient and an AC coefficient in a first column or a first row of the block to be decoded are predicted from the block A or the block B.

FIG. 6 is a diagram showing contents of the DC/AC prediction processing based on the H.263 system. In FIG. 6, a symbol RecC indicates a coefficient value of the block C before the DC/AC prediction processing is performed and a symbol RecC' indicates a coefficient value of the block C after the DC/AC prediction processing is performed. Similarly, a symbol RecA' indicates a coefficient value of the block A after the DC/AC prediction processing is performed and a symbol RecB' indicates a coefficient value of the block B after the DC/AC prediction processing is performed. A symbol clipAC( ) indicates a function for performing clipping to a range of −2048 to 2047. Further, a symbol oddifyclipDC( ) indicates a function for performing, when a target value is an even number, oddifying processing for adding 1 to the value and, then, performing clipping to a range of 0 to 2047, and, when a target value is an odd number, directly performing clipping to the range of 0 to 2047.

In the H.263 system, a predicting method for predicting how the DC coefficient and the AC coefficient in the first column or the first row of the block C to be decoded is given by extracted information called INTRA_MODE information. As this INTRA_MODE information, three modes, a prediction mode 0 to a prediction mode 2, are specified. The DC/AC prediction processing is applied to respective blocks in a macro block in a designated prediction mode.

The prediction mode 0 is a mode for predicting only the DC coefficient. The DC coefficient of the block C is predicted from an average of a DC coefficient of the block A and a DC coefficient of the block B. As shown in FIG. 6, prediction is performed from the block B when only the block A cannot be used, prediction is performed from the block A when only the block B cannot be used, and prediction is performed by using a constant value "1024" when both the block A and the block B cannot be used. "When the adjacent block cannot be used" means that the adjacent block is not included in the same video picture segment or the adjacent block is not intra-encoded.

The prediction mode 1 is a mode for predicting the DC coefficient and the AC coefficient in the first row from the block A. When the block A cannot be used, prediction is performed by using a constant value "1024" as the DC coefficient of the block A and using a constant value "0" as an AC coefficient of the block A.

The prediction mode 2 is a mode for predicting the DC coefficient and the AC coefficient in the first column from the block B. As in the prediction mode 1, when the block B cannot be used, prediction is performed by using the constant value "1024" as the DC coefficient of the block B and using the constant value "0" as an AC coefficient of the block B.

As explained above, in the H.263 system, unlike the MPEG-4 system, the scaling operation for the adjacent block is not performed. This is because the DC/AC prediction processing in the H.263 system is performed after inverse quantization is performed and it is unnecessary to take into account a difference in a quantization scale among the blocks.

Finally, the saturation processing is applied to the coefficient values subjected to the DC/AC prediction processing in this way. The saturation processing in the H.263 system is performed according to the oddifyclipDC( ) function and the clipAC( ) function.

Next, detailed operations of the decoding circuit according to this embodiment are explained.

First, an operation example of decoding for encoded data encoded on the basis of the MPEG-4 system is explained.

First, when an encoded stream is supplied to the decoding circuit, the variable length decoding section 2 restores encoded data included in the encoded stream. The encoding-information extracting section 3 extracts, as extracted information, information concerning encoded data for performing the decoding from system data. In other words, in the case of this operation example, first, the encoding-information extracting section 3 detects that supplied encoded data is encoded data generated on the basis of the MPEG-4 system and notifies the controlling section 7 of encoding type information indicating that an encoding type is the MPEG-4 system. The encoding-information extracting section 3 extracts short_video_header information, ac_pred_flag information, intra/inter information, and the like from contents of the encoded stream and notifies the controlling section 7 of the extracted information.

The controlling section 7 generates, according to such extracted information from the encoding-information extracting section 3, control information necessary for the DC/AC prediction processing and sets the generated control information in the respective sections. In this operation example, when it is determined that the short_video_header information is "0", assuming that the DC/AC prediction processing is performed, the controlling section 7 sets the intra/inter information in the DC/AC prediction processing section 1 and sets control information designating the operation in the respective processing sections.

The controlling section 7 determines, on the basis of whether blocks adjacent above, on the left, and on the upper left of a block to be decoded are out of a boundary of a VOP (Video Object Plane) or a video packet or whether the adjacent blocks are intra-encoded, whether the adjacent blocks are available. The controlling section 7 sets a determination result in the coefficient selection processing section 11 as adjacent block availability information.

As predetermined constant values used instead of coefficient values when the adjacent blocks cannot be used, the controlling section 7 sets "1024" as specified DC coefficient value information and sets "0" as specified AC coefficient value information.

The controlling section 7 sets, in the coefficient arithmetic processing section 12, scaling implementation/non-implementation information representing whether a scaling operation for a DC coefficient used for determining a predicting direction and a scaling operation for a DC coefficient and an AC coefficient used for prediction processing should be carried out. In other words, the controlling section 7 sets, for the DC coefficient used for the determination of a predicting direction, scaling implementation/non-implementation information indicating that the multiplication processing in the first multiplier 120 is performed and the multiplication processing in the second multiplier 121, the rounding processing by the rounding operator 122, and the shift operation by the shift operator 123 are not performed.

On the other hand, the controlling section 7 sets, for the DC coefficient and the AC coefficient used for the prediction processing, scaling implementation/non-implementation information indicating that all of the multiplication processing in the first multiplier 120, the multiplication processing in the second multiplier 121, the rounding processing by the rounding operator 122, and the shift operation by the shift operator 123 are performed. Although explanation of detailed values is omitted, the controlling section 7 sets inverses of values "1" to "46", which can be taken as a quantization scale value used for the scaling operation, as inverse value information and sets bit accuracy necessary for a division in the scaling operation as inverse value accuracy information.

The controlling section 7 sets, in the direction determination processing section 14, predicting method determination information indicating that a predicting direction is determined by using coefficient comparison result information calculated by the coefficient comparison processing section 13 and sets, in the direction determination processing section 14, predicting method judgment information indicating that prediction is performed from the left direction when a correlation in the horizontal direction and a correlation in the vertical direction are equal.

The controlling section 7 sets, on the basis of the ac_pred_flag information extracted from the encoded stream, in the prediction processing section 15, AC coefficient prediction implementation/non-implementation information representing whether prediction of an AC coefficient should be performed. In other words, the controlling section 7 sets AC coefficient prediction implementation/non-implementation information indicating that the prediction of an AC coefficient is not performed when the ac_pred_flag information is "0" and sets AC coefficient prediction implementation/non-implementation information indicating that the prediction of an AC coefficient is performed when the ac_pred_flag information is "1".

The controlling section 7 sets, in the saturation processing section 16, oddifying processing implementation/non-implementation information for performing the oddifying processing and sets, in the saturation processing section 16, clipping control information for clipping a DC coefficient value and an AC coefficient value to fit in a range of "−2048" to "2047".

On the other hand, when it is determined that the short_video_header information is "1", although explanation of detailed setting contents is omitted, the controlling section 7 sets control information in the DC/AC prediction processing section 1 not to perform the DC/AC prediction processing. As explained so far, first, the controlling section 7 sets control information such that the DC/AC prediction processing section 1 processes encoded data generated on the basis of the MPEG-4 system.

Next, detailed operations of the DC/AC prediction processing section 1 in which the control information is set as explained above are explained. In particular, operations performed when the short_video_header information is determined as "0" and it is set by the intra/inter information that a macro block or a block to be decoded is intra-encoded are explained.

First, DC coefficients and AC coefficients of blocks adjacent to above, on the left, and on the upper left of a block to be encoded are supplied to the coefficient selection processing section 11. The coefficient selection processing section 11 selects, according to the adjacent block availability information set by the controlling section 7, the supplied DC coefficient value and AC coefficient value of the adjacent block or a constant value "1024" or "0" set as specified DC coefficient value information or specified AC coefficient value information. When it is set by the adjacent block availability information that the adjacent block is available, the coefficient selection processing section 11 selects the DC coefficient and the AC coefficient of the block. When it is set by the adjacent block availability information that the adjacent block cannot be used, the coefficient selection processing section 11 selects the constant value "1024" or "0" as the DC coefficients or the AC coefficients of the block. The DC coefficient value and the AC coefficient value of the adjacent block selected in this way are supplied to the coefficient arithmetic processing section 12.

The coefficient arithmetic processing section 12 applies, according to the scaling implementation/non-implementation information, the inverse value information, and the inverse value accuracy information, the scaling operation processing to the supplied DC coefficient and AC coefficient of the adjacent block. When a DC coefficient used for determination of a predicting direction is calculated, only the multiplication processing in the first multiplier 120 is performed. This is equivalent to processing for calculating a coefficient value after the inverse quantization processing is further applied to a coefficient value after the DC/AC prediction processing.

Similarly, when a DC coefficient and an AC coefficient used for the prediction processing are calculated, all of the multiplication processing in the first multiplier 120, the multiplication processing in the second multiplier 121, the rounding processing by the rounding operator 122, and the shift operation by the shift operator 123 are performed. In the multiplication processing in the second multiplier 121, the rounding processing by the rounding operator 122, and the shift operation by the shift operator 123, processing for the division according to the quantization scale is performed by using the inverse value information and the inverse value accuracy information. The DC coefficient used for the determination of a predicting direction, which is obtained in this way, is supplied to the coefficient comparison processing section 13 and the DC coefficient and the AC coefficient used for the prediction processing are supplied to the prediction processing section 15.

The coefficient comparison processing section 13 calculates, on the basis of DC coefficient values subjected to the scaling operation of the blocks adjacent on the left and on the upper left of and above the block to be decoded, a correlation among blocks in the horizontal direction and the vertical direction as coefficient comparison result information. The calculated coefficient comparison result information is supplied to the direction determination processing section 14.

The direction determination processing section 14 determines, according to the predicting method determination information set by the controlling section 7, a predicting direction from a differential value of the DC coefficient values calculated by the coefficient comparison processing section 13. When a horizontal direction correlation degree is smaller than a vertical direction correlation degree in the coefficient comparison result information, the direction determination processing section 14 determines, assuming that a correlation is stronger in the horizontal direction than in the vertical direction, a predicting direction such that prediction is performed on the basis of the block adjacent on the left of the block to be decoded. When the vertical direction correlation degree is smaller than the horizontal direction correlation degree in the coefficient comparison result information, the direction determination processing section 14 determines, assuming that a correlation is stronger in the vertical direction than in the horizontal direction, a predicting direction such that prediction is performed on the basis of the block adjacent above the block to be decoded.

When the horizontal direction correlation degree and the vertical direction correlation degree are equal in the correlation comparison result information, the direction determination processing section 14 determines, according to the predicting method judgment information set by the controlling section 7, a predicting direction such that prediction is performed on the basis of the block adjacent on the left of the block to be decoded. The predicting direction determined in this way is supplied to the prediction processing section 15 as prediction information.

The prediction processing section 15 restores the DC coefficient and the AC coefficient by selecting, according to the prediction information determined by the direction determination processing section 14 and the AC coefficient prediction implementation/non-implementation information set by the controlling section 7, the DC coefficient value and the AC coefficient value of the adjacent block supplied from the coefficient arithmetic processing section 12 and adding the DC coefficient value and the AC coefficient value to the encoded data supplied from the inverse scan processing section 4. Specifically, when it is designated by the prediction information supplied from the direction determination processing section 14 that prediction is performed from the block adjacent above the block to be decoded, first, the prediction processing section 15 adds a DC coefficient value of the block adjacent above the block to be decoded, which is supplied from the coefficient arithmetic processing section 12, to a DC coefficient supplied from the inverse scan processing section 4 to restore the DC coefficient.

Further, when it is set by the AC coefficient prediction implementation/non-implementation information that prediction of an AC coefficient is carried out, the prediction processing section 15 adds an AC coefficient value in a first row of the block adjacent above the block to be decoded, which is supplied from the coefficient arithmetic processing section 12, to an AC coefficient in a first row subsequently supplied from the inverse scan processing section 4 to restore the AC coefficient.

Conversely, when it is set by the AC coefficient prediction implementation/non-implementation information that prediction of an AC coefficient is not carried out, the prediction processing section 15 does not apply any processing to the AC coefficient in the first row supplied from the inverse scan processing section 4. On the other hand, when it is designated by the prediction information supplied from the direction determination processing section 14 that prediction is performed from the block adjacent on the left of the block to be decoded, similarly, the prediction processing section 15 performs restoration of the DC coefficient and the AC coefficient in the first column from the block adjacent on the left of the block to be decoded. The DC coefficient value and the AC coefficient value restored in this way are supplied from the saturation processing section 16.

The saturation processing section 16 does not perform the oddifying processing according to the oddifying processing implementation/non-implementation information set by the controlling section 7. The saturation processing section 16 only performs, according to the clipping control information set by the controlling section 7, the saturation processing for clipping the DC coefficient value and the AC coefficient value restored by the prediction processing section 15 to fit in predetermined constant values, respectively. In other words, the saturation processing section 16 performs the saturation processing for clipping, when the DC coefficient value and the AC coefficient value are equal to or smaller than "−2048", the DC coefficient value and the AC coefficient value to a value set to "−2048" and clipping, when the DC coefficient value and the AC coefficient value are equal to or larger than "2047", the DC coefficient value and the AC coefficient value to a value set to "2047".

In this embodiment, in order to obtain a DC coefficient value after the inverse quantization processing is performed, which is used for determination of a predicting direction, the first multiplier 120 in the DC/AC prediction processing section 1 performs the multiplication processing. However, the DC/AC prediction processing section 1 may be configured to receive and use an output result of the inverse quantization section 5.

Next, an operation example of decoding for encoded data encoded on the basis of the H.263 system is explained.

As in the MPEG-4 system first, when an encoded stream is supplied to the decoding circuit, the variable length decoding section 2 restores encoded data included in the encoded stream. The encoding-information extracting section 3 extracts information concerning encoded data for performing the decoding from system data or the like as extracted information. In the case of this operation example, first, the encoding-information extracting section 3 detects that the supplied encoded data is encoded data generated on the basis of the H.263 system and notifies the controlling section 7 of encoding type information indicating that an encoding type is the H.263 system. The encoding-information extracting section 3 extracts, from contents of the encoded stream, the information representing whether the Advanced INTRA Coding mode specified by ANNEX I should be used, the INTRA_MODE information, the intra/inter information, and the like and notifies the controlling section 7 of the extracted information.

The controlling section 7 generates, according to such extracted information from the encoding-information extracting section 3, control information necessary for the DC/AC prediction processing and sets the generated control information in the respective sections. In this operation example, when it is notified that the Advanced INTRA Coding mode specified by ANNEX I is used, assuming that the DC/AC prediction processing is performed, the controlling section 7 sets the intra/inter information in the DC/AC prediction processing section 1 and sets control information for designating operations in the respective processing sections.

The controlling section 7 determines, on the basis of whether the block adjacent above and on the left of the block to be decoded are included in the same video picture segment or whether the adjacent blocks are intra-encoded, whether the adjacent blocks are available. The controlling section 7 sets a determination result in the coefficient selection processing section 11 as adjacent block availability information.

As predetermined constant values used instead of coefficient values when the adjacent blocks cannot be used, the controlling section 7 sets "1024" as specified DC coefficient value information and sets "0" as specified AC coefficient value information.

The controlling section 7 sets, in the coefficient arithmetic processing section 12, information indicating that the scaling operation is not applied to any of the coefficients as scaling implementation/non-implementation information. The controlling section 7 sets, as predicting method determination information, in the direction determination processing section 14, information indicating that the coefficient comparison result information calculated by the coefficient comparison processing section 13 is not used and prediction conforming to the INTRA_MODE information extracted from the encoded stream is performed.

The controlling section 7 sets, on the basis of the INTRA_MODE information extracted from the encoded stream, in the prediction processing section 15, AC coefficient prediction implementation/non-implementation information indicating whether prediction of an AC coefficient is performed. The controlling section 7 sets, in the prediction processing section 15, AC coefficient prediction implementation/non-implementation information indicating that prediction of an AC coefficient is not performed when the INTRA_MODE information is the prediction mode 0 and sets, in the prediction processing section 15, AC coefficient prediction implementation/non-implementation information indicating that prediction of an AC coefficient is performed when the INTRA_MODE information is the prediction mode 1 or the prediction mode 2.

The controlling section 7 sets, in the saturation processing section 16, oddifying processing implementation/non-implementation information for performing the oddifying processing and sets, in the saturation processing section 16, clipping control information for clipping a DC coefficient value to fit in a range of "0" to "2047" and clipping an AC coefficient value to fit in a range of "−2048" to "2047".

On the other hand, when it is notified that the Advanced INTRA Coding mode specified by ANNEX I is not used, the controlling section 7 sets control information in the DC/AC prediction processing section 1 not to perform the DC/AC prediction processing. As explained so far, the controlling section 7 is configured to first set control information such that the DC/AC prediction processing section 1 processes encoded data generated on the basis of the H.263 system.

Next, detailed operations of the DC/AC prediction processing section 1 in which the control information is set as explained above are explained. In particular, operations performed when the Advanced INTRA Coding mode specified by ANNEX I is used and it is set by the intra/inter information that a macro block or a block to be decoded is intra-encoded are explained.

First, DC coefficients and AC coefficients of blocks adjacent above and on the left of a block to be encoded are supplied to the coefficient selection processing section 11. The coefficient selection processing section 11 selects, according to the adjacent block availability information set by the controlling section 7, the supplied DC coefficient value and AC coefficient value of the adjacent block or a constant value "1024" or "0" set as specified DC coefficient value information or specified AC coefficient value information. When it is set by the adjacent block availability information that the adjacent block is available, the coefficient selection processing section 11 selects the DC coefficient and the AC coefficient of the block. When it is set by the adjacent block availability information that the adjacent block cannot be used, the coefficient selection processing section 11 selects the constant value "1024" or "0" as the DC coefficients or the AC coefficients of the block. The DC coefficient value and the AC coefficient value of the adjacent block selected in this way are supplied to the coefficient arithmetic processing section 12.

Since it is set by the scaling implementation/non-implementation information that the scaling operation is not performed, the coefficient arithmetic processing section 12 does not apply any processing to the DC coefficient and the AC coefficient supplied from the coefficient selection processing section 11 and directly supplies the DC coefficient and the AC coefficient to the prediction processing section 15.

Since it is set by the predicting method determination information that a predicting direction is determined by using a prediction mode designated by the INTRA_MODE information, the coefficient comparison processing section 13 does not calculate a correlation among blocks in the horizontal direction and the vertical direction. Therefore, in the case of the H.263 system, operations of the coefficient comparison processing section 13 are undefined.

The direction determination processing section 14 supplies, according to the predicting method determination information set by the controlling section 7, in the prediction processing section 15, prediction information indicating that prediction is performed according to the INTRA_MODE information.

The prediction processing section 15 selects, according to the prediction information determined by the direction determination processing section 14 and the AC coefficient prediction implementation/non-implementation information set by the controlling section 7, a DC coefficient value and an AC coefficient value of the adjacent block supplied from the coefficient arithmetic processing section 12 and adds the DC coefficient value and the AC coefficient value to the encoded data supplied from the inverse scan processing section 4 to restore the DC coefficient and the AC coefficient. Specifically, when it is designated by the prediction information supplied by the direction determination processing section 14 that prediction is performed in the prediction mode 0 in the INTRA_MODE information, the prediction processing section 15 adds an average of a DC coefficient of the block adjacent above the block to be decoded and a DC coefficient of the block adjacent on the left of the block to be decoded, which are supplied from the coefficient arithmetic processing section 12, to a DC coefficient supplied from the inverse scan processing section 4 to restore the DC coefficient.

Since it is set by the AC coefficient prediction implementation/non-implementation information that prediction of an AC coefficient is not carried out, the prediction processing section 15 does not apply any processing to the AC coefficient supplied from the inverse scan processing section 4.

When it is designated that prediction is performed in the prediction mode 1 in the INTRA_MODE information, first, the prediction processing section 15 adds a DC coefficient value of the block adjacent above the block to be decoded, which is supplied from the coefficient arithmetic processing section 12, to a DC coefficient supplied from the inverse scan processing section 4 to restore the DC coefficient. Since it is set by the AC coefficient prediction implementation/non-implementation information that prediction of an AC coefficient is performed, the prediction processing section 15 adds an AC coefficient value in a first row of the block adjacent above the block to be decoded, which is supplied from the coefficient arithmetic processing section 12, to an AC coefficient in a first row subsequently supplied from the inverse scan processing section 4 to restore the AC coefficient.

When it is designated that prediction is performed in the prediction mode 2 in the INTRA_MODE information, in the same manner as explained above, the prediction processing section 15 adds a DC coefficient value and an AC coefficient value in a first column of the block adjacent on the left of the block to be decoded to a DC coefficient and an AC coefficient in a first column supplied from the inverse scan processing section 4 to restore the DC coefficient and the AC coefficient in the first column. The DC coefficient value and the AC coefficient value restored in this way are supplied to the saturation processing section 16.

The saturation processing section 16 performs the oddifying processing for the DC coefficient according to the oddifying processing implementation/non-implementation information set by the controlling section 7. The saturation processing section 16 performs, according to the clipping control information set by the controlling section 7, saturation processing for clipping the restored DC coefficient value and AC coefficient value to fit in predetermined constant values, respectively. The saturation processing section 16 performs saturation processing for clipping, when the DC coefficient value is equal to or smaller than "0", the DC coefficient value to a value set to "0" and clipping, when the DC coefficient value is equal to or larger than "2047", the DC coefficient value to a value set to "2047". The saturation processing section 16 performs saturation processing for clipping, when the AC coefficient value is equal to or smaller than "−2048", the AC coefficient value to a value set to "−2048" and clipping, when the AC coefficient value is equal to or larger than "2047", the AC coefficient value to a value set to "2047".

The DC/AC prediction processing section 1 in the decoding circuit according to this embodiment has the configuration explained above. Control information for the various image encoding systems is generated by the controlling section 7 on the basis of extracted information extracted by the encoding-information extracting section 3. The control information is set in the respective processing sections; the coefficient selection processing section 11, the coefficient arithmetic processing section 12, the coefficient comparison processing section 13, the direction determination processing section 14, the prediction processing section 15, and the saturation processing section 16. The respective processing sections operate to perform processing according to the set control information.

With such a configuration, a DC/AC prediction circuit that can perform, with a single circuit, decoding in association with DC/AC prediction processing in the various image encoding systems is realized.

In the above explanation, the embodiment in which all kinds of control information set in the DC/AC prediction processing section 1 are generated by the controlling section 7 and the control information is set in the respective processing sections is explained. However, in such an embodiment, it is likely that a processing amount of the controlling section 7 increases. Therefore, it may be configured that: among types of extracted information extracted by the encoding-information extracting section 3; only the type of information appearing at a relatively low frequency, such as a picture level, is supplied to the controlling section 7; whereas type of information appearing at a relatively high frequency, such as a macro block level, is supplied to the DC/AC prediction processing section 1 or a processing section similar thereto to generate and set the control information without the intervention of the controlling section.

Second Embodiment

Next, a decoding circuit according to a second embodiment of the present invention is explained. FIG. 7 is a block diagram showing a configuration of a DC/AC prediction processing section according to the second embodiment of the present invention. Concerning the decoding circuit according to the second embodiment shown in FIG. 7, components same as those of the decoding circuit according to the first embodiment shown in FIG. 2 are denoted by the same reference numerals and symbols, explanation of the components is omitted, and only different components are explained. A configuration of the entire decoding circuit according to the second embodiment is the same as the configuration of the entire decoding circuit shown in FIG. 1.

In the first embodiment, the inverse table 124 is configured by a memory such as an SRAM and contents of the table are set by inverse value information. However, the present invention is not specifically limited to this. In this embodiment, an inverse value having sufficient accuracy set in advance is stored in a ROM (Read Only Memory). The inverse table 124 is configured to slice the stored inverse value at a finite number of digits according to inverse value accuracy information and output the inverse value. This is because arithmetic operation accuracy necessary for a division performed in a scaling operation may be different according to an encoding system.

However, in this case, it is likely that an arithmetic operation error occurs because the inverse value is sliced at the finite number of digits. Therefore, in order to correct the arithmetic operation error, the division processing section 125 further includes an inverse-value correcting section 126. The inverse-value correcting section 126 is configured by, for example, an adder and corrects the inverse value stored in the inverse table 124. Specifically, the inverse-value correcting section 126 reads out the inverse value set in advance, which is stored in the inverse table 124, and adds a correction value to the read-out inverse value. The inverse-value correcting section 126 outputs the inverse value added with the correction value to the second multiplier 121 as a new inverse value. The correction value is set as a part of coefficient arithmetic operation information by the controlling section 7.

Since the inverse value stored in the inverse table 124 is corrected by the inverse-value correcting section 126 in this way, it is possible to highly accurately perform arithmetic processing using the corrected inverse value. Since the inverse table 124 is configured by the ROM rather than the RAM, it is possible to realize a reduction in a circuit size.

In this embodiment, the inverse-value correcting section 126 corresponds to an example of the inverse-value correcting section.

Operations of the decoding circuit according to the second embodiment are the same as the operations of the decoding circuit according to the first embodiment except that a constant value can be changed in the coefficient selection processing section 11 and that the inverse value stored in the inverse table 124 can be corrected. Therefore, explanation of the operations is omitted.

Third Embodiment

Figure 8:
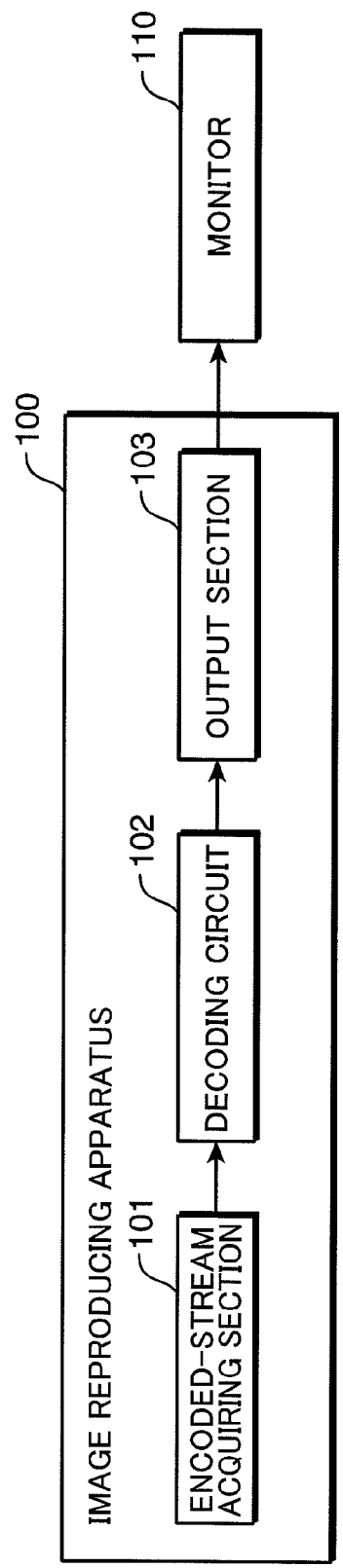
FIG. 8 is a block diagram showing a configuration of an image reproducing apparatus according to a third embodiment of the present invention.
Figure 9:
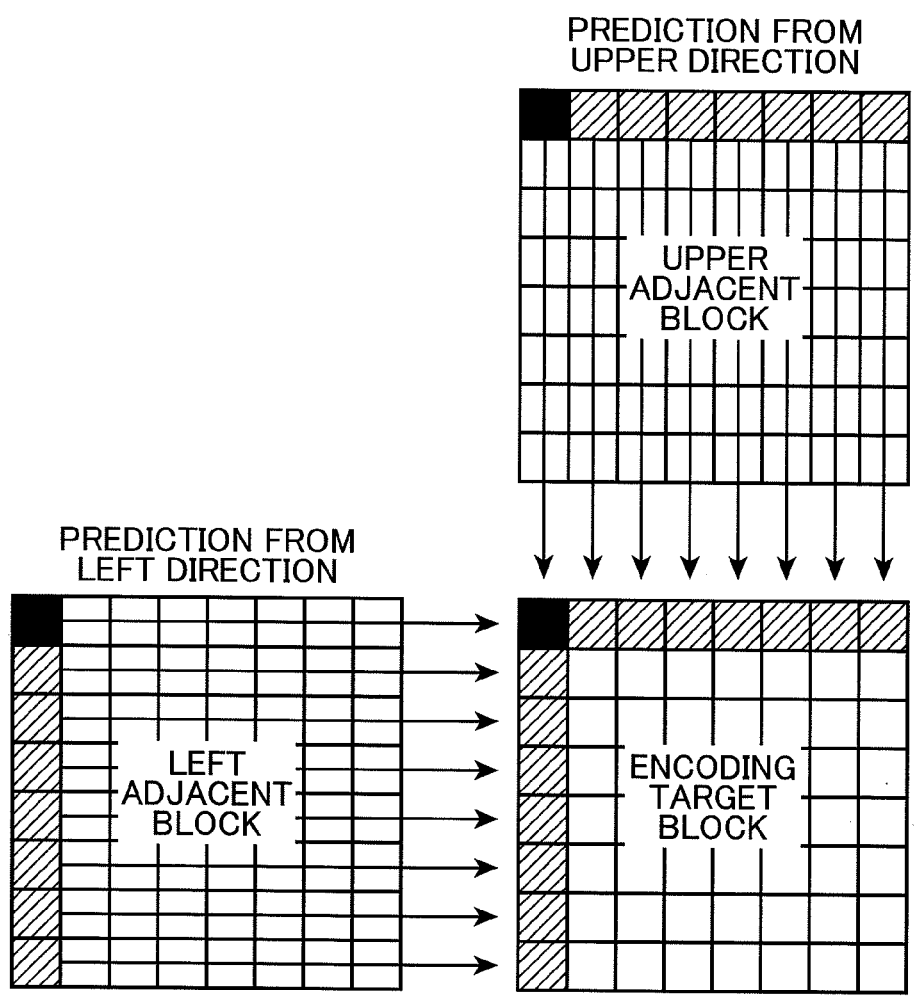
FIG. 9 is a conceptual diagram for explaining DC/AC prediction encoding.

FIG. 8 is a block diagram of a configuration of an image reproducing apparatus according to a third embodiment of the present invention. Examples of the image reproducing apparatus include a personal computer, a set-top box, an optical disk recorder, an optical disk player, a television, a portable information terminal apparatus, and a cellular phone.

An image reproducing apparatus 100 shown in FIG. 8 includes an encoded-stream acquiring section 101, a decoding circuit 102, and an output section 103. The encoded-stream acquiring section 101 acquires an encoded stream. The encoded-stream acquiring section 101 acquires the encoded stream via a network, acquires the encoded stream by reading an optical disk such as a DVD or a Blu-ray disk, and acquires the encoded stream from a broadcasting wave via an antenna.

The decoding circuit 102 is the decoding circuit explained in the first and second embodiments. The decoding circuit 102 extracts encoded data generated by image compression encoding from the encoded stream acquired by the encoded-stream acquiring section 101 and decodes the extracted encoded data. The output section 103 outputs image data decoded by the decoding circuit 102 to a monitor 110. The monitor 110 displays the image data outputted by the output section 103.

The image reproducing apparatus 100 is mounted with any one of the decoding circuits explained in the first and second embodiments. Therefore, the image reproducing apparatus 100 according to this embodiment can perform, with a single circuit, decoding in association with various encoding systems.

The present invention has been explained on the basis of the embodiments. However, it goes without saying that the present invention is not limited by the embodiments. Cases explained below are also included in the present invention.

A part or all of the components configuring the decoding circuit according to this embodiment may be included in one system LSI (Large Scale Integration). The system LSI is an ultra multifunction LSI manufactured by integrating plural components on one chip.

Respective sections of the components configuring the circuit may be individually formed as one chip or may be formed as one chip to include a part or all of the sections.

The circuit is referred to as system LSI above. However, according to a difference in an integration degree, the circuit may be referred to as IC (Integrated Circuit), LSI, super LSI, or ultra LSI. A method of circuit integration is not limited to the LSI and may be realized by a dedicated circuit or a general-purpose processor. After the LSI is manufactured, a programmable FPGA (Field Programmable Gate Array) or a reconfigurable processor that can reconfigure connection and setting of circuit cells in the LSI may be used.

Moreover, if a technique for circuit integration replacing the LSI according to the development of the semiconductor technique or other techniques deriving from the semiconductor technique, naturally, integration of functional blocks may be performed by using the technique. Adaptation of the biotechnology or the like could be possible.

The present invention may be the decoding method. The present invention may be a computer program that realizes this decoding method with a computer or may be a digital signal including the computer program.

The present invention may be the computer program or the digital signal recorded in computer readable recording media such as a flexible disk, a hard disk, a CD-ROM, an MO, a DVD, a DVD-ROM, a DVD-RAM, a BD (Blu-ray Disc), and a semiconductor memory. The present invention may be the digital signal recorded in these recording media.

The present invention may be the computer program or the digital signal transmitted through networks represented by an electric communication line, a radio communication line, a wire communication line, and the Internet, a data broadcast, and the like.

The present invention may be a computer system including a microprocessor and a memory, the memory may store the computer program, and the microprocessor may operate according to the computer program.

The program or the digital signal may be carried out by independent another computer system by recording the program or the digital signal in the recording media and transferring the same or by transferring the program or the digital signal through the networks and the like.

The embodiments and the modifications may be combined with each other.

Inventions having the following configurations are mainly included in the specific embodiments explained above.

A decoding circuit according to an aspect of the present invention is a decoding circuit that decodes encoded data generated by image compression encoding for transforming image data into a coefficient value in a block unit of a predetermined number of pixels, quantizing the transformed coefficient value of each of the blocks at predetermined quantization width, and predicting a DC coefficient as a direct current component and an AC coefficient as an alternating current component of the block on the basis of a block adjacent thereto, the decoding circuit including: a decoded-data storing section that temporarily stores, as adjacent block information, decoded data obtained by applying decoding in the block unit to the encoded data supplied thereto; a coefficient selection processing section that selects, from the adjacent block information stored in the decoded-data storing section, a DC coefficient and an AC coefficient of an adjacent block adjacent to a block to be decoded; a coefficient arithmetic processing section that applies predetermined arithmetic processing to the DC coefficient and the AC coefficient selected by the coefficient selection processing section; a coefficient comparison processing section that calculates inter-block correlations in the horizontal direction and the vertical direction on the basis of the DC coefficient subjected to the predetermined arithmetic processing by the coefficient arithmetic processing section; a determination processing section that determines a predicting method using the inter-block correlations calculated by the coefficient comparison processing section; a prediction processing section that adds, using the predicting method determined by the determination processing section, the DC coefficient and the AC coefficient subjected to the predetermined arithmetic processing by the coefficient arithmetic processing section, to the supplied encoded data; and a controlling section that controls, according to contents of the supplied encoded data, one or plural methods among a selecting method in the coefficient selection processing section, an arithmetic processing method in the coefficient arithmetic processing section, a determining method in the determination processing section, and a prediction processing method in the prediction processing section.

With this configuration, decoded data obtained by applying, in a block unit, the decoding to encoded data supplied thereto is temporarily stored in the decoded-data storing section as adjacent block information. A DC coefficient and an AC coefficient of an adjacent block adjacent to a block to be decoded are selected from the adjacent block information, which is stored in the decoded-data storing section, by the coefficient selection processing section. Predetermined arithmetic processing is applied to the DC coefficient and the AC coefficient, which are selected by the coefficient selection processing section, by the coefficient arithmetic processing section. Inter-block correlations in the horizontal direction and the vertical direction are calculated by the coefficient comparison processing section on the basis of the DC coefficient subjected to the predetermined arithmetic processing by the coefficient arithmetic processing section. Subsequently, a predicting method is determined by the determination processing section by using the inter-block correlations calculated by the coefficient comparison processing section. The DC coefficient and the AC coefficient subjected to the predetermined arithmetic processing by the coefficient arithmetic processing section are added to the supplied encoded data by the prediction processing section by using the predicting method determined by the determination processing section. One or plural methods among the selecting method in the coefficient selection processing section, the arithmetic processing method in the coefficient arithmetic processing section, the determining method in the determination processing section, and the prediction processing method in the prediction processing section are controlled by the controlling section according to contents of the supplied encoded data.

Therefore, since one or plural methods among the selecting method in the coefficient selection processing section, the arithmetic processing method in the coefficient arithmetic processing section, the determining method in the determination processing section, and the prediction processing method in the prediction processing section are controlled according to contents of the supplied encoded data, it is possible to provide a decoding device that can perform, with a single circuit, decoding in association with various image encoding systems and has universality. Even if an encoding system employing a new DC/AC prediction processing method is proposed, it is possible to quickly cope with the new DC/AC prediction processing method by changing the processing methods in the respective processing sections according to encoded data. Redesign of an LSI and the like for performing decoding is unnecessary.

It is preferable that, in the decoding circuit, the coefficient selection processing section selects any one of the DC coefficient and the AC coefficient obtained from the adjacent block information and predetermined constant values on the basis of information indicating whether the adjacent block is available.

With this configuration, any one of the DC coefficient and the AC coefficient obtained from the adjacent block information and the predetermined constant values is selected by the coefficient selection processing section on the basis of the information indicating whether the adjacent block is available. Therefore, it is possible to perform the decoding using the predetermined constant values instead of the DC coefficient and the AC coefficient when the adjacent block cannot be used.

It is preferable that, in the decoding circuit, the constant value selected by the coefficient selection processing section can be set. With this configuration, since the constant value selected by the coefficient selection processing section can be set, it is possible to set predetermined constant value for an encoding system instead of the DC coefficient and the AC coefficient.

It is preferable that, in the decoding circuit, the coefficient arithmetic processing section includes a first multiplication processing section that multiplies the DC coefficient and the AC coefficient of the adjacent block selected by the coefficient selection processing section with a first quantization scale value indicating quantization width of a block in which the DC coefficient and the AC coefficient of the adjacent block are included and a division processing section that divides the DC coefficient and the AC coefficient multiplied with the first quantization scale value by the first multiplication processing section by a second quantization scale value indicating quantization width of the block to be decoded.

With this configuration, by the first multiplication processing section, the DC coefficient and the AC coefficient of the adjacent block selected by the coefficient selection processing section are multiplied with the first quantization scale value indicating the quantization width of the block in which the DC coefficient and the AC coefficient of the adjacent block are included. By the division processing section, the DC coefficient and the AC coefficient multiplied with the first quantization scale value by the first multiplication processing section are divided by the second quantization scale value indicating the quantization width of the block to be decoded.

Therefore, it is possible to realize multiplication processing by the first quantization scale value of the adjacent block and division processing by the second quantization scale value of the decoding target block in a scaling operation.

It is preferable that, in the decoding circuit, the division processing section includes an inverse-value storing section that stores plural inverse values for the second quantization scale value, a second multiplication processing section that multiplies the DC coefficient and the AC coefficient multiplied with the first quantization scale value by the first multiplication processing section with the inverse value, a rounding processing section that performs rounding processing by adding a rounding value to the DC coefficient and the AC coefficient multiplied with the inverse value by the second multiplication processing section, and a shift processing section that applies, by a predetermined shift amount, right bit shift processing to the DC coefficient and the AC coefficient subjected to the rounding processing by the rounding processing section.

With this configuration, the plural inverse values for the second quantization scale value are stored in the inverse-value storing section. The DC coefficient and the AC coefficient multiplied with the first quantization scale value by the first multiplication processing section is multiplied with the inverse value by the second multiplication processing section. The rounding processing is performed by the rounding processing section by adding the rounding value to the DC coefficient and the AC coefficient multiplied with the inverse value by the second multiplication processing section. Thereafter, by the shift processing section, the right bit shift processing is applied, by the predetermined shift amount, to the DC coefficient and the AC coefficient subjected to the rounding processing by the rounding processing section.

Therefore, it is possible to realize the division processing by the second quantization scale value of the decoding target block by multiplying the DC coefficient and the AC coefficient with the inverse value for the second quantization scale value, performing the rounding processing, and performing the right bit shift processing.

It is preferable that, in the decoding circuit, the first multiplication processing section, the second multiplication processing section, the rounding processing section, and the shift processing section select, on the basis of information indicating whether predetermined arithmetic operations in the first multiplication processing section, the second multiplication processing section, the rounding processing section, and the shift processing section are performed, any one of a calculated value subjected to an arithmetic operation and an uncalculated value not subjected to the arithmetic operation.

With this configuration, in the first multiplication processing section, the second multiplication processing section, the rounding processing section, and the shift processing section, any one of the calculated value subjected to the arithmetic operation and the uncalculated value not subjected to the arithmetic operation is selected on the basis of the information indicating whether the predetermined arithmetic operations in the first multiplication processing section, the second multiplication processing section, the rounding processing section, and the shift processing section are performed. In other words, among plural kinds of arithmetic processing, there are necessary arithmetic processing and unnecessary arithmetic processing depending on an encoding system. It is possible to apply only the necessary arithmetic processing.

It is preferable that, in the decoding circuit, the first multiplication processing section, the second multiplication processing section, the rounding processing section, and the shift processing section select any one of the calculated value and the uncalculated value on the basis of information indicating whether the predetermined arithmetic operations in the first multiplication processing section, the second multiplication processing section, the rounding processing section, and the shift processing section, which are determined according to a type of the coefficient value, are performed.

With this configuration, in the first multiplication processing section, the second multiplication processing section, the rounding processing section, and the shift processing section, any one of the calculated value and the uncalculated value is selected on the basis of the information indicating whether the predetermined arithmetic operations in the first multiplication processing section, the second multiplication processing section, the rounding processing section, and the shift processing section, which are determined according to a type of the coefficient value, are performed. Therefore, it is possible to apply arithmetic processing for the various encoding systems.

It is preferable that, in the decoding circuit, the first multiplication processing section, the second multiplication processing section, the rounding processing section, and the shift processing section select any one of the calculated value and the uncalculated value on the basis of information indicating whether the predetermined arithmetic operations in the first multiplication processing section, the second multiplication processing section, the rounding processing section, and the shift processing section, which are determined according to a relation between the first quantization scale value and the second quantization scale value, are performed.

With this configuration, in the first multiplication processing section, the second multiplication processing section, the rounding processing section, and the shift processing section, any one of the calculated value and the uncalculated value is selected on the basis of the information indicating whether the predetermined arithmetic operations in the first multiplication processing section, the second multiplication processing section, the rounding processing section, and the shift processing section, which are determined according to a relation between the first quantization scale value and the second quantization scale value, are performed.

When the first quantization scale value and the second quantization scale value are equal, encoding efficiency does not fall even if the scaling operation is not performed. Therefore, when the first quantization scale value and the second quantization scale value are equal, the arithmetic processing is unnecessary. Therefore, it is possible to select, according to the relation between the first quantization scale value and the second quantization scale value, whether the respective kinds of arithmetic processing are performed.

It is preferable that, in the decoding circuit, the division processing section further includes an inverse-value correcting section that corrects the inverse value stored in the inverse-value storing section. With this configuration, since the inverse value stored in the inverse-value storing section is corrected by the inverse-value correcting section, it is possible to highly accurately perform the arithmetic operation using the corrected inverse value.

It is preferable that, in the decoding circuit, the inverse-value correcting section adds a correction value to plural inverse values set in advance, which are stored in the inverse-value storing section.

With this configuration, the correction value is added to the plural inverse values set in advance, which are stored in the inverse-value storing section, and the inverse value added with the correction value is outputted to the second multiplication processing section as a new inverse value. Therefore, it is possible to highly accurately perform the arithmetic processing by adding the correction value to the plural inverse values set in advance.

It is preferable that, in the decoding circuit, the inverse value in the second multiplication processing section, the rounding value in the rounding processing section, and the right bit shift amount in the shift processing section can be set according to an encoding system.

With this configuration, since the inverse value in the second multiplication processing section, the rounding value in the rounding processing section, and the right bit shift amount in the shift processing section can be set according to an encoding system, it is possible to select arithmetic operation accuracy of a division according to the encoding system.

It is preferable that, in the decoding circuit, the determination processing section determines a predicting method using the inter-block correlation calculated by the coefficient comparison processing section and selects, on the basis of information indicating whether a predicting method is determined by using the inter-block correlation, any one of the determined predicting method and a predetermined predicting method set in advance.

With this configuration, a predicting method is determined by the determination processing section by using the inter-block correlation calculated by the coefficient comparison processing section. Any one of the determined predicting method and the predetermined predicting method set in advance is selected by the determination processing section on the basis of information indicating whether a predicting method is determined by using the inter-block correlation. Therefore, even when a predicting method cannot be determined by using the inter-block correlation, it is possible to perform the decoding using the predetermined predicting method set in advance.

It is preferable that, in the decoding circuit, the determination processing section determines a predicting method according to whether the adjacent block adjacent to the block to be decoded is available for prediction.

With this configuration, since a predicting method is determined by the determination processing section according to whether the adjacent block adjacent to the block to be decoded is available for prediction. Therefore, it is possible to determine a predicting method when the adjacent block is available for prediction and select the predetermined predicting method set in advance when the adjacent block cannot be used for prediction.

It is preferable that, in the decoding circuit, the determination processing section selects, when a correlation in the horizontal direction and a correlation in the vertical direction are equal in the inter-block correlation calculated by the coefficient comparison processing section, from which of the horizontal direction and the vertical direction prediction is performed.

With this configuration, when a correlation in the horizontal direction and a correlation in the vertical direction are equal in the inter-block correlation calculated by the coefficient comparison processing section, it is selected by the determination processing section from which of the horizontal direction and the vertical direction prediction is performed. Therefore, when the correlation in the horizontal direction and the correlation in the vertical direction are equal, it is possible to select, according to an encoding system, from which of the horizontal direction and the vertical direction prediction is performed.

It is preferable that, in the decoding circuit, the prediction processing section selects, on the basis of information indicating whether an arithmetic operation in the prediction processing section is performed according to a type of the coefficient value, any one of a calculated value subjected to an arithmetic operation for adding the DC coefficient and the AC coefficient subjected to the predetermined arithmetic processing by the coefficient arithmetic processing section to the supplied encoded data and an uncalculated value not subjected to the arithmetic operation.

With this configuration, any one of a calculated value subjected to the arithmetic operation for adding the DC coefficient and the AC coefficient subjected to the predetermined arithmetic processing by the coefficient arithmetic processing section to the supplied encoded data and an uncalculated value not subjected to the arithmetic operation is selected by the prediction processing section on the basis of information indicating whether an arithmetic operation in the prediction processing section is performed according to a type of the coefficient value. Therefore, it is possible to select, according to a type of the coefficient value, whether the DC coefficient and the AC coefficient subjected to the predetermined arithmetic processing by the coefficient arithmetic processing section is added to the supplied encoded data.

It is preferable that the decoding circuit further includes a saturation processing section that performs, when a DC coefficient and an AC coefficient obtained by the prediction processing section are equal to or larger than predetermined values or equal to or smaller than predetermined values, saturation processing for clipping the DC coefficient and the AC coefficient to the predetermined values.

With this configuration, when a DC coefficient and an AC coefficient obtained by the prediction processing section are equal to or larger than predetermined values or equal to or smaller than predetermined values, the DC coefficient and the AC coefficient are clipped to the predetermined values by the saturation processing section. Therefore, it is possible to set the DC coefficient and the AC coefficient to values in predetermined ranges.

It is preferable that, in the decoding circuit, a range of the clipping in the saturation processing section can be set. With this configuration, since a range of the clipping in the saturation processing section can be set, it is possible to change the range of the clipping according to an encoding system.

It is preferable that, in the decoding circuit, the saturation processing section performs oddifying processing by applying a predetermined arithmetic operation to the DC coefficient and selects, on the basis of information indicating whether the oddifying processing is performed, any one of a processed value subjected to the oddifying processing and an unprocessed value not subjected to the oddifying processing.

With this configuration, the oddifying processing is performed by the saturation processing section by applying the predetermined arithmetic operation to the DC coefficient. Any one of a processed value subjected to the oddifying processing and an unprocessed value not subjected to the oddifying processing is selected by the saturation processing section on the basis of information indicating whether the oddifying processing is performed. Therefore, it is possible to select, according to an encoding system, whether the oddifying processing is performed.

An decoding method according to another aspect of the present invention is a decoding method for decoding encoded data generated by image compression encoding for transforming image data into a coefficient value in a block unit of a predetermined number of pixels, quantizing the transformed coefficient value of each of the blocks at predetermined quantization width, and predicting a DC coefficient as a direct current component and an AC coefficient as an alternating current component of the block on the basis of a block adjacent thereto, the decoding method including: a coefficient selection processing step of selecting, from adjacent block information stored in a decoded-data storing section that temporarily stores, as the adjacent block information, decoded data obtained by applying decoding in the block unit to the encoded data supplied thereto, a DC coefficient and an AC coefficient of an adjacent block adjacent to a block to be decoded; a coefficient arithmetic processing step of applying predetermined arithmetic processing to the DC coefficient and the AC coefficient selected in the coefficient selection processing step; a coefficient comparison processing step of calculating inter-block correlations in the horizontal direction and the vertical direction on the basis of the DC coefficient subjected to the predetermined arithmetic processing in the coefficient arithmetic processing step; a determination processing step of determining a predicting method using the inter-block correlations calculated in the coefficient comparison processing step; a prediction processing step of adding, using the predicting method determined in the determination processing step, the DC coefficient and the AC coefficient subjected to the predetermined arithmetic processing in the coefficient arithmetic processing step, to the supplied encoded data; and a controlling step of controlling, according to contents of the supplied encoded data, one or plural methods among a selecting method in the coefficient selection processing step, an arithmetic processing method in the coefficient arithmetic processing step, a determining method in the determination processing step, and a prediction processing method in the prediction processing step.

With this configuration, decoded data obtained by applying, in a block unit, the decoding to encoded data supplied thereto is temporarily stored in the decoded-data storing section as adjacent block information. A DC coefficient and an AC coefficient of an adjacent block adjacent to a block to be decoded are selected from the adjacent block information, which is stored in the decoded-data storing section, in the coefficient selection processing step. Next, predetermined arithmetic processing is applied to the DC coefficient and the AC coefficient, which are selected in the coefficient selection processing step, in the coefficient arithmetic processing step. Inter-block correlations in the horizontal direction and the vertical direction are calculated in the coefficient comparison processing step on the basis of the DC coefficient subjected to the predetermined arithmetic processing in the coefficient arithmetic processing step. Subsequently, a predicting method is determined in the determination processing step by using the inter-block correlations calculated in the coefficient comparison processing step. The DC coefficient and the AC coefficient subjected to the predetermined arithmetic processing in the coefficient arithmetic processing step are added to the supplied encoded data in the prediction processing step by using the predicting method determined in the determination processing step. One or plural methods among the selecting method in the coefficient selection processing step, the arithmetic processing method in the coefficient arithmetic processing step, the determining method in the determination processing step, and the prediction processing method in the prediction processing step are controlled in the controlling step according to contents of the supplied encoded data.

Therefore, since one or plural methods among the selecting method in the coefficient selection processing step, the arithmetic processing method in the coefficient arithmetic processing step, the determining method in the determination processing step, and the prediction processing method in the prediction processing step are controlled according to contents of the supplied encoded data, it is possible to provide a decoding method that can perform, with a single circuit, decoding in association with various image encoding systems and has universality. Even if an encoding system employing a new DC/AC prediction processing method is proposed, it is possible to quickly cope with the new DC/AC prediction processing method by changing the processing methods in the respective processing steps according to encoded data. Redesign of an LSI and the like for performing decoding is unnecessary.

An image reproducing apparatus according to still another aspect of the present invention includes: an encoded-data acquiring section that acquires encoded data; the aforementioned decoding circuit that decodes the encoded data acquired by the encoded-data acquiring section; and an output section that outputs image data decoded by the decoding circuit.

With this configuration, encoded data is acquired by the encoded-data acquiring section. The encoded data acquired by the encoded-data acquiring section is decoded by the aforementioned decoding circuit. Image data decoded by the decoding circuit is outputted by the output section.

Therefore, it is possible to apply the decoding circuit to image reproducing apparatuses such as a personal computer, a set-top box, a portable information terminal apparatus, and a cellular phone.

INDUSTRIAL APPLICABILITY

The decoding circuit and the image reproducing apparatus according to the present invention can be used for, for example, an integrated circuit such as an LSI having a function of applying decoding to encoded data, which is data encoded on the basis of an encoding system for an image, an information apparatus such as a personal computer, a set-top box, a portable information terminal apparatus, or a cellular phone including such an integrated circuit, and other apparatuses.

The invention claimed is:

1. A decoding circuit that decodes encoded data generated by image compression encoding for transforming image data into a coefficient value in a block unit of a predetermined number of pixels, quantizing the transformed coefficient value of each of blocks at a predetermined quantization width, and predicting a DC coefficient as a direct current component and an AC coefficient as an alternating current component of a block, of the blocks, based on a block adjacent thereto, the decoding circuit comprising:
  an encoding-information extracting section that extracts extracted information, which is information concerning the encoded data, from the encoded data;
  a decoded-data storing section that temporarily stores, as adjacent block information, decoded data obtained by applying decoding in the block unit to the encoded data;
  a coefficient selection processing section that selects, from the adjacent block information stored in the decoded-data storing section, the DC coefficient and the AC coefficient of an adjacent block adjacent to a block to be decoded;
  a coefficient arithmetic processing section that applies predetermined arithmetic processing to the DC coefficient and the AC coefficient selected by the coefficient selection processing section;
  a coefficient comparison processing section that calculates inter-block correlations in a horizontal direction and a vertical direction based on the DC coefficient subjected to the predetermined arithmetic processing by the coefficient arithmetic processing section;
  a determination processing section that determines a predicting method using the inter-block correlations calculated by the coefficient comparison processing section;

a prediction processing section that adds, using the predicting method determined by the determination processing section, the DC coefficient and the AC coefficient subjected to the predetermined arithmetic processing by the coefficient arithmetic processing section, to the encoded data; and a controlling section that (i) designates, as processing sections, at least two or more of the coefficient selection processing section, the coefficient arithmetic processing section, the determination processing section, and the prediction processing section, (ii) generates, using the extracted information, control information for controlling the designated processing sections, respectively, and (iii) sets the generated control information in the designated processing sections, respectively, to individually change operations of the designated processing sections, wherein, when the controlling section designates the coefficient selection processing section, the controlling section (i) generates, using the extracted information, coefficient selection information indicating whether plural adjacent blocks are available as prediction information, and (ii) sets the generated coefficient selection information in the coefficient selection processing section, so as to indicate to the coefficient selection processing section whether to use the plural adjacent blocks in the coefficient selection processing section, wherein, when the controlling section designates the coefficient arithmetic processing section, the controlling section (i) generates, using the extracted information, coefficient arithmetic operation information indicating whether to perform each arithmetic operation of arithmetic operations of a scaling operation, and (ii) sets the generated coefficient arithmetic operation information in the coefficient arithmetic processing section, so as to indicate to the coefficient arithmetic processing section whether to perform each of the arithmetic operations of the scaling operation in the coefficient arithmetic processing section, wherein, when the controlling section designates the determination processing section, the controlling section (i) generates, using the extracted information, direction determination information indicating whether to determine the predicting method using coefficient comparison result information calculated in the coefficient comparison processing section or to determine the predicting method using a predetermined predicting method, and (ii) sets the generated direction determination information in the determination processing section, so as to indicate to the determination processing section whether the determination processing section is to determine the predicting method using the coefficient comparison result information or using the predetermined predicting method, and wherein, when the controlling section designates the prediction processing section, the controlling section (i) generates, using the extracted information, prediction control information indicating whether to apply prediction processing to the AC coefficient, and (ii) sets the generated prediction control information in the prediction processing section, so as to indicate to the prediction processing section whether to apply the prediction processing to the AC coefficient in the prediction processing section.

2. The decoding circuit according to claim 1, wherein the coefficient selection processing section selects any one of the DC coefficient and the AC coefficient of the adjacent block information and predetermined constant values based on information indicating whether the adjacent block is available.

3. The decoding circuit according to claim 2, wherein a constant value selected by the coefficient selection processing section is set.

4. The decoding circuit according to claim 1, wherein the coefficient arithmetic processing section includes:
   a first multiplication processing section that multiplies the DC coefficient and the AC coefficient of the adjacent block selected by the coefficient selection processing section with a first quantization scale value indicating a quantization width of a block in which the DC coefficient and the AC coefficient of the adjacent block are included; and
   a division processing section that divides the DC coefficient and the AC coefficient multiplied with the first quantization scale value by the first multiplication processing section by a second quantization scale value indicating a quantization width of the block to be decoded.

5. The decoding circuit according to claim 4, wherein the division processing section includes:
   an inverse-value storing section that stores plural inverse values for the second quantization scale value;
   a second multiplication processing section that multiplies the DC coefficient and the AC coefficient multiplied with the first quantization scale value by the first multiplication processing section with an inverse value of the inverse values;
   a rounding processing section that performs rounding processing by adding a rounding value to the DC coefficient and the AC coefficient multiplied with the inverse value by the second multiplication processing section; and
   a shift processing section that applies, by a predetermined shift amount, right bit shift processing to the DC coefficient and the AC coefficient subjected to the rounding processing by the rounding processing section.

6. The decoding circuit according to claim 5, wherein the first multiplication processing section, the second multiplication processing section, the rounding processing section, and the shift processing section select, based on information indicating whether predetermined arithmetic operations in the first multiplication processing section, the second multiplication processing section, the rounding processing section, and the shift processing section are performed, any one of a calculated value subjected to an arithmetic operation and an uncalculated value not subjected to the arithmetic operation.

7. The decoding circuit according to claim 6, wherein the first multiplication processing section, the second multiplication processing section, the rounding processing section, and the shift processing section select any one of the calculated value and the uncalculated value based on information indicating whether the predetermined arithmetic operations in the first multiplication processing section, the second multiplication processing section, the rounding processing section, and the shift processing section, which are determined according to a type of a coefficient value, are performed.

8. The decoding circuit according to claim 6, wherein the first multiplication processing section, the second multiplication processing section, the rounding processing section, and the shift processing section select any one of the calculated value and the uncalculated value based on information indicating whether the predetermined arithmetic operations in the first multiplication processing section, the second multiplication processing section, the rounding processing section, and the shift processing section, which are determined according to a relation between the first quantization scale value and the second quantization scale value, are performed.

9. The decoding circuit according to claim 5, wherein the division processing section further includes an inverse-value correcting section that corrects the inverse value stored in the inverse-value storing section.

10. The decoding circuit according to claim 9, wherein the inverse-value correcting section adds a correction value to the plural inverse values set in advance, which are stored in the inverse-value storing section.

11. The decoding circuit according to claim 5, wherein the inverse value in the second multiplication processing section, the rounding value in the rounding processing section, and an amount of the right bit shift in the shift processing section can be set according to an encoding system.

12. The decoding circuit according to claim 1, wherein the determination processing section determines the predicting method using an inter-block correlation, of the inter-block correlations, calculated by the coefficient comparison processing section and selects, based on information indicating whether the predicting method is determined by using the inter-block correlation, any one of the determined predicting method and a predetermined predicting method set in advance.

13. The decoding circuit according to claim 12, wherein the determination processing section determines the predicting method according to whether the adjacent block adjacent to the block to be decoded is available for prediction.

14. The decoding circuit according to claim 12, wherein the determination processing section selects, when a correlation in the horizontal direction and a correlation in the vertical direction are equal in the inter-block correlation calculated by the coefficient comparison processing section, from which of the horizontal direction and the vertical direction prediction is performed.

15. The decoding circuit according to claim 1, wherein the prediction processing section selects, based on information indicating whether an arithmetic operation in the prediction processing section is performed according to a type of a coefficient value, any one of a calculated value subjected to an arithmetic operation for adding the DC coefficient and the AC coefficient subjected to the predetermined arithmetic processing by the coefficient arithmetic processing section to the encoded data and an uncalculated value not subjected to the arithmetic operation.

16. The decoding circuit according to claim 1, further comprising:
a saturation processing section that performs, when the DC coefficient and the AC coefficient obtained by the prediction processing section are equal to or larger than predetermined values or equal to or smaller than predetermined values, saturation processing for clipping the DC coefficient and the AC coefficient to the predetermined values.

17. The decoding circuit according to claim 16, wherein a range of the clipping in the saturation processing section is set.

18. The decoding circuit according to claim 16, wherein the saturation processing section performs oddifying processing by applying a predetermined arithmetic operation to the DC coefficient and selects, based on information indicating whether the oddifying processing is performed, any one of a processed value subjected to the oddifying processing and an unprocessed value not subjected to the oddifying processing.

19. A decoding method for decoding encoded data generated by image compression encoding for transforming image data into a coefficient value in a block unit of a predetermined number of pixels, quantizing the transformed coefficient value of each of blocks at a predetermined quantization width, and predicting a DC coefficient as a direct current component and an AC coefficient as an alternating current component of a block, of the blocks, based on a block adjacent thereto, the decoding method comprising:

an encoding-information extracting step of extracting extracted information, which is information concerning the encoded data, from the encoded data;

a coefficient selection processing step of selecting, from adjacent block information stored in a decoded-data storing section that temporarily stores, as the adjacent block information, decoded data obtained by applying decoding in the block unit to the encoded data, the DC coefficient and the AC coefficient of an adjacent block adjacent to a block to be decoded;

a coefficient arithmetic processing step of applying predetermined arithmetic processing to the DC coefficient and the AC coefficient selected in the coefficient selection processing step;

a coefficient comparison processing step of calculating inter-block correlations in a horizontal direction and a vertical direction based on the DC coefficient subjected to the predetermined arithmetic processing in the coefficient arithmetic processing step;

a determination processing step of determining a predicting method using the inter-block correlations calculated in the coefficient comparison processing step;

a prediction processing step of adding, using the predicting method determined in the determination processing step, the DC coefficient and the AC coefficient subjected to the predetermined arithmetic processing in the coefficient arithmetic processing step, to the encoded data; and a controlling step of (i) designating, as processing steps, at least two or more of the coefficient selection processing step, the coefficient arithmetic processing step, the determination processing step, and the prediction processing step, (ii) generating, using the extracted information, control information for controlling the designated processing steps, respectively, and (iii) setting the generated control information in the designated processing steps, respectively, to individually change operations of the designated processing steps, wherein, when the controlling step designates the coefficient selection processing step, the controlling step (i) generates, using the extracted information, coefficient selection information indicating whether plural adjacent blocks are available as prediction information, and (ii) sets the generated coefficient selection information for the coefficient selection processing step, so as to determine in the coefficient selection processing step whether to use the plural adjacent blocks in the coefficient selection processing step, wherein, when the controlling step designates the coefficient arithmetic processing step, the controlling step (i) generates, using the extracted information, coefficient arithmetic operation information indicating whether to perform each arithmetic operation of arithmetic operations of a scaling operation, and (ii) sets the generated coefficient arithmetic operation information for the coefficient arithmetic processing step, so as to determine in the coefficient arithmetic processing step whether to perform each of the arithmetic operations of the scaling operation in the coefficient arithmetic processing step, wherein, when the controlling step designates the determination processing step, the controlling step (i) generates, using the extracted information, direction determination information indicating whether to determine the predicting method using coefficient comparison result information calculated in the coefficient comparison processing step or to determine the predicting method using a predetermined predicting method, and (ii) sets the generated direction determination information for the determination processing step, so as to determine in the determination processing step whether the determination processing step is to determine the predicting method using the coefficient comparison result information or using the predetermined predicting method, and wherein, when the controlling step designates the prediction processing step, the controlling step (i) generates, using the extracted information, prediction control information indicating whether to apply prediction processing to the AC coefficient, and (ii) sets the generated prediction control information for the prediction processing step, so as to determine in the prediction processing step whether to apply the prediction processing to the AC coefficient in the prediction processing step.

20. An image reproducing apparatus comprising:
an encoded-data acquiring section that acquires encoded data;
the decoding circuit according to claim 1 that decodes the encoded data acquired by the encoded-data acquiring section; and
an output section that outputs image data decoded by the decoding circuit.

21. The decoding circuit according to claim 1, wherein
the extracted information includes encoding type information representing an image encoding system used in generating the encoded data, picture information representing an encoding method of an encoded picture, and block information representing an encoding method of the block, and the controlling section designates the processing sections from among the coefficient selection processing section, the coefficient arithmetic processing section, the determination processing section, and the prediction processing section, and generates the control information for controlling the designated processing sections, respectively, using the extracted information including the encoding type information, the picture information and the block information that have been extracted.

22. The decoding circuit according to claim 1, wherein the extracted information includes encoding type information representing an image encoding system used in generating the encoded data, picture information representing an encoding method of an encoded picture, and macro block information representing an encoding method of a macro block, and the controlling section designates the processing sections from among the coefficient selection processing section, and the arithmetic processing section, the determination processing section, and the prediction processing section, and generates control information for controlling the designated processing sections, respectively, using the extracted information including the encoding type information, the picture information and the macro block information that have been extracted.

* * * * *